(12) United States Patent
Moore et al.

(10) Patent No.: US 11,014,839 B2
(45) Date of Patent: May 25, 2021

(54) LIQUID TREATMENT DEVICE

(71) Applicant: Hydrosmart, Parkside (AU)

(72) Inventors: Robert Bruce Moore, Parkside (AU);
Chris Ian Murphy, Parkside (AU);
Paul John Pearce, Parkside (AU)

(73) Assignee: Hydrosmart, Parkside (AU)

( * ) Notice: Subject to any disclaimer, the term of this patent is extended or adjusted under 35 U.S.C. 154(b) by 503 days.

(21) Appl. No.: 14/308,239

(22) Filed: Jun. 18, 2014

(65) Prior Publication Data

US 2014/0374236 A1    Dec. 25, 2014

Related U.S. Application Data

(60) Provisional application No. 61/836,967, filed on Jun. 19, 2013.

(51) Int. Cl.
*C02F 1/48* (2006.01)
*C05F 7/00* (2006.01)
(Continued)

(52) U.S. Cl.
CPC ............... *C02F 1/487* (2013.01); *C05F 7/00* (2013.01); *C02F 1/441* (2013.01); *C02F 2103/06* (2013.01); *C02F 2103/08* (2013.01); *C02F 2201/483* (2013.01); *C02F 2201/486* (2013.01); *C02F 2209/005* (2013.01);
(Continued)

(58) Field of Classification Search
CPC .............. C02F 1/487; C02F 2103/06; C02F 2201/486; C02F 1/441; C02F 2201/483; C02F 2209/005; C02F 2103/08; C05F 7/00; Y02A 20/144; Y02A 40/213; Y02A 40/20; Y02W 10/37

USPC .................... 204/155–158.21; 205/339–340; 422/186–187
See application file for complete search history.

(56) References Cited

U.S. PATENT DOCUMENTS 2,460,288 A * 2/1949 Hansen ................... H01J 23/36
330/45
3,286,522 A * 11/1966 Cushing ................... G01F 1/58
73/861.11
(Continued)

FOREIGN PATENT DOCUMENTS

AU         606376 B2    2/1991
AU      2005317945 B2   9/2011
(Continued)

OTHER PUBLICATIONS

Electromagnetic Waves, Boston University, Jul. 26, 1999 (Year: 1999).*
(Continued)

*Primary Examiner* — Nicholas A Smith
*Assistant Examiner* — Colleen M Raphael
(74) *Attorney, Agent, or Firm* — Merchant & Gould P.C.

(57) ABSTRACT

A liquid treatment device comprising: two antennae; an enclosure for holding a liquid including a solvent and a solute; a generator operatively connected to the two antennae to generate an oscillating voltage in each antenna, wherein each voltage is out of phase with the other to create an oscillating electric-field; and the liquid in the enclosure being subjected to the electric-field in the presence of a magnetic field to change the chemical and/or physical properties of the solute, without the liquid contacting the two antennae.

39 Claims, 4 Drawing Sheets

(51) Int. Cl.
*C02F 103/08* (2006.01)
*C02F 1/44* (2006.01)
*C02F 103/06* (2006.01)

(52) U.S. Cl.
CPC ............. *Y02A 20/144* (2018.01); *Y02A 40/20* (2018.01); *Y02W 10/37* (2015.05)

(56) References Cited

U.S. PATENT DOCUMENTS

| | | | | |
|---|---|---|---|---|
| 4,299,701 | A * | 11/1981 | Garrett | C02F 1/485 210/222 |
| 4,850,959 | A * | 7/1989 | Findl | A61B 5/6831 604/14 |
| 4,865,747 | A * | 9/1989 | Larson | C02F 1/487 422/186.01 |
| 5,074,998 | A * | 12/1991 | De Baat | C02F 1/485 210/222 |
| 5,087,336 | A * | 2/1992 | Liboff | A61N 2/02 204/155 |
| 5,171,431 | A * | 12/1992 | Schulte | C02F 1/487 210/143 |
| 5,670,041 | A * | 9/1997 | Cho | C02F 1/487 210/222 |
| 5,725,778 | A | 3/1998 | Cho et al. | |
| 5,738,766 | A | 4/1998 | Jefferson | |
| 6,146,526 | A | 11/2000 | Pandolfo | |
| 6,217,773 | B1 * | 4/2001 | Graham | B01D 61/025 210/223 |
| 6,875,360 | B2 * | 4/2005 | Allen | C02F 1/487 204/557 |
| 6,939,469 | B2 * | 9/2005 | Ohkawa | H01J 49/42 204/155 |
| 7,160,426 | B2 | 1/2007 | Baosheng | |
| 7,520,985 | B2 * | 4/2009 | Nilsen | B01D 17/04 210/243 |
| 7,544,334 | B2 * | 6/2009 | Frost | H01J 37/321 422/186 |
| 7,887,708 | B2 | 2/2011 | Chew | |
| 7,910,006 | B2 | 3/2011 | Vallee | |
| 8,236,144 | B2 * | 8/2012 | Proudkii | B01J 19/088 422/186 |
| 2003/0076087 | A1 * | 4/2003 | Minchole | B82Y 25/00 204/557 |
| 2003/0160000 | A1 * | 8/2003 | Holland | B01J 19/12 210/695 |
| 2004/0007452 | A1 * | 1/2004 | Warren | B01D 57/02 204/155 |
| 2004/0118782 | A1 * | 6/2004 | Allen | C02F 1/487 210/695 |
| 2005/0161379 | A1 * | 7/2005 | Tsuboi | C02F 1/485 210/138 |
| 2005/0178710 | A1 * | 8/2005 | Kitada | B01J 8/025 210/222 |
| 2007/0051685 | A1 * | 3/2007 | Wittmer | C02F 1/484 210/695 |
| 2009/0065444 | A1 * | 3/2009 | Alley | B01D 61/025 210/748.01 |
| 2009/0166207 | A1 * | 7/2009 | Dorado Gonzalez | B03C 3/49 204/665 |
| 2009/0242407 | A1 * | 10/2009 | Shiga | C02F 1/48 204/557 |
| 2011/0209978 | A1 * | 9/2011 | Leichner | B01J 19/087 204/155 |
| 2012/0037491 | A1 * | 2/2012 | Park | H01J 37/321 204/156 |
| 2013/0146464 | A1 * | 6/2013 | Shiga | C02F 1/485 204/557 |
| 2014/0070090 | A1 * | 3/2014 | Kostyukevich | H01J 49/38 250/282 |
| 2015/0344335 | A1 * | 12/2015 | Hughes | C02F 1/487 204/661 |

FOREIGN PATENT DOCUMENTS

| | | |
|---|---|---|
| CA | 2 660 467 A1 | 2/2009 |
| CN | 1212953 A | 4/1999 |
| DE | 102013008403 A1 * | 11/2014 |
| EP | 1 741 677 A1 | 1/2007 |
| GB | 2 312 635 A | 11/1997 |
| JP | 2004-137532 A | 5/2004 |
| SE | 503 588 C2 * | 7/1996 |
| WO | WO 96/12972 A2 | 5/1996 |
| WO | 1998/052876 A1 | 11/1998 |
| WO | 2006/072125 A1 | 7/2006 |

OTHER PUBLICATIONS

Derwent Abstract of SE 503 588 C2 (Year: 1996).*
Australian Examination Report No. 1 for Australian Patent Application No. 2014203279 dated Jan. 11, 2018, 4 pages.

* cited by examiner

Stage 1  Stage 3
Stage 2  Stage 4

E = Electrical field     B = Magnetic field
                         (out of page)

LIQUID TREATMENT DEVICE

This application claims benefit of Ser. No. 61/836,967, filed 19 Jun. 2013 in the United States and which application is incorporated herein by reference. To the extent appropriate, a claim of priority is made to the above disclosed application.

FIELD OF INVENTION

The present invention relates to a device for treating liquids to improve dissolution of solutes.

BACKGROUND OF THE INVENTION

Solutes dissolved or suspended in water, may include minerals or salts. These solutes may be both a benefit and a problem to a range of industries, depending on the amount and type of solutes present. The industries affected include, for example, in irrigation of crops and lawns, in agriculture, mining, town management and many other land uses, where groundwater/borewater or sea water are the only available sources of sufficient volumes of water for a required application.

For example, in desalination industries, dissolved mineral salts including sodium chloride, are removed from saline water by passing the water over a selectively permeable membrane. This membrane typically contains minute pores, which allows water to pass while excluding complexes of water and mineral ions. Buildup of minerals on the membrane may reduce the efficiency of the reverse osmosis process during desalination.

In a further example, in agricultural industries, pipes and infrastructure may become scaled with limescale or iron scale as agriculturalists often use borewater/groundwater sources that contain high levels of minerals such as calcium carbonate, magnesium carbonate, and sodium chloride.

These borewater/groundwater sources may be used to water crops or livestock. However, carbonates precipitate over time, producing scale, which may clog the irrigation systems and reduce flow. As a result, pipes of these irrigation systems have to be periodically cleaned, or if the scaling is particularly severe, the entire irrigation system has to be replaced.

Another deleterious effect of the precipitation is the reduction in concentration of minerals in the borewater for crops to absorb. In agricultural industries, mineral nutrients provide many organisms such as plants with trace elements such as calcium, phosphorous, potassium, sulfur, sodium, chlorine and magnesium required for their growth.

Mineral nutrients present in water can be obtained by organisms for their own needs. However, if the mineral content in the water is insufficient to meet the nutritional requirements of the organisms, additional sources of minerals have to be used to supplement the organisms' intake. For example, the addition of fertilizer to crops. These measures can be costly and time consuming.

Electrolysis has been used to improve the solubility of minerals in solution. However, this technique requires the use of electrodes to treat the water. This can be difficult to implement as it requires access to the water such as through portholes cut into existing pipes to insert the electrodes into the water. Furthermore, the electrodes would have to be monitored and periodically replaced, which increases maintenance cost.

It is desirable to provide a device that can improve dissolution of solutes, such as for example, minerals, salts and fertilizers in water without the use of electrodes. Advantageously, the device can be retrofitted onto existing pipes.

SUMMARY OF THE INVENTION

In this specification, although the disclosure is directed towards treating water, the liquid treatment device can also be used to treat liquids including solutions, colloidal mixtures and slurries.

In one form of the invention, there is provided a liquid treatment device comprising:
two antennae;
an enclosure for holding a liquid including a solvent and a solute;
a generator operatively connected to the two antennae to generate an oscillating voltage in each antenna, wherein each voltage is out of phase with the other to create an oscillating electric-field; and
the liquid in the enclosure being subjected to the electric-field in the presence of a magnetic field to change the chemical and/or physical properties of the solute, without the liquid contacting the two antennae.

In another form of the invention, there is provided a liquid treatment device comprising:
two antennae;
an enclosure for holding a liquid including a solvent and a solute;
a generator operatively connected to the two antennae to generate an oscillating voltage in each antenna wherein each voltage is out of phase with the other to create an oscillating electric-field having an oscillating voltage frequency being a function of the strength of a magnetic field, the atomic/molecular charge or dipole of a solvent or solute and the atomic/molecular mass of that solvent or solute; and
the liquid in the enclosure being subjected to the electric-field in the presence of the magnetic field to change the chemical and/or physical properties of the solute, without the liquid contacting the two antennae.

Changing the chemical and/or physical properties of the solute may include any one or a combination of increasing solubility, increasing mobility or changing chemical reactivity of the solute in the liquid.

Increasing the mobility of the solute may involve increasing the mass transfer or diffusion of the solute in the liquid.

Changing the chemical and/or physical properties of the solute may involve changing the activation energy of the solute.

The antennae are electrically isolated from the liquid. For example, the antennae can be wrapped around a pipe containing the liquid to be treated, whereby the pipe electrically insulates the antennae from the liquid and/or the antennae are sheathed to electrically insulate them from the liquid. The antennae do not include electrodes that have to contact the liquid to treat the liquid.

The magnetic field may be an ambient, imposed or combined magnetic field.

The magnetic field strength may comprise of natural and/or imposed magnetic field in the enclosure. The magnetic field may be homogeneous or non-homogeneous.

The solute or solvent charge may be the solute charge or solvent dipole charge. The solute may be positively or negatively charged. The solute may be mineral or non-mineral in nature.

The atomic/molecular mass may be the atomic/molecular mass of the solute or the solvent.

The generator may generate one or more frequencies to target one or more solutes. A frequency may also be selected to target the solvent.

The frequency f of the oscillating voltage in each antenna may be proportional to the magnetic field strength B:

$$f \propto B$$

The frequency may be controlled by the generator, for example, by first converting mains alternating current (AC) to direct current (DC), before generating voltages of particular frequencies. As such, the frequencies output by the generator are not a function of the mains AC frequency.

The generator may be powered by a DC power source, such as for example, a solar DC power source to generate oscillating voltages.

Preferably, the frequency of the oscillating voltage in each antenna is a harmonic of the fundamental frequency of a solvent or solute, and is calculated using the cyclotron resonance harmonic formula:

$$f_{n+1} = (n+1) \cdot Bq/2\pi m$$

wherein $f_{n+1}$ is an overtone of fundamental frequency, B is the magnetic field strength, q is the solvent charge, solute charge or solvent dipole charge, m is the atomic/molecular mass of the solvent or solute and n equals zero or any whole number. In cases where n=0, the cyclotron resonance harmonic formula reduces to the cyclotron resonance formula.

The frequency of the oscillating voltage in each antenna may be calculated using the cyclotron resonance formula:

$$f = \frac{Bq}{2\pi m}$$

wherein scalar f is the frequency of the electric field modulation, scalar B is the magnetic field strength, scalar q is the solvent charge solute charge or solvent dipole charge, and m is the atomic/molecular mass of the solvent or solute.

The liquid treatment device may include a power supply, a means of estimating or measuring magnetic field strength and a calculator for calculating an oscillating voltage to generate an oscillating electric field, wherein the generator uses the power supply to generate the oscillating electric field.

Suitably, the means for estimating or measuring a magnetic field strength is a magnetometer.

The liquid treatment device may further include a controller for carrying out any one or more steps of: receiving a signal that conveys the magnetic field strength, calculating a frequency of the oscillating electric field based on the magnetic field strength, and sending a signal to the generator to generate the oscillating electric field using the power supply.

The liquid may be subjected to an agitation force that is a function of electric field strength, magnetic field strength and instantaneous velocity of an included solvent or solute particle.

The controller may carry out any one or more steps of: selecting an agitation force, estimating or measuring a magnetic field strength, selecting a frequency for an oscillating electric field based on the agitation force selected and sending a signal to the generator to generate the oscillating electric field using the power supply.

Suitably, the liquid is subjected to an agitation force calculated using the Lorentz force formula:

$$F = |q|[E + (v \times B)]$$

wherein vector B is comprised of the instantaneous strength and direction of the magnetic field, scalar q is the solvent charge solute charge or solvent dipole charge, vector E is comprised of the strength and direction of the alternating electrical field alternating at any frequency, vector v is the instantaneous velocity (comprised of speed and direction) of an included solvent or solute particle, vector F is the force acting on a charge q when q moves within coexisting electrical and magnetic fields, and vector F is at right angles to both vector B and vector E.

The Lorentz force formula can be used with an electric field having any frequency, including a frequency calculated using the cyclotron resonance formula. In addition, it will be appreciated that the frequency of the electric field may not be calculated using the cyclotron resonance formula.

In one embodiment, the controller may be used for calculating the frequency of the electric field based on the magnetic field strength obtained from the magnetometer.

In another embodiment, the calculator may be used to calculate the agitation force acting on a charge q when q moves within coexisting electrical and magnetic fields.

The calculations using either the cyclotron resonance formula or the Lorentz force formula are made individually for each type of solvent or solute. Different types of solvent and solute require separate calculations using the formulae. It will be appreciated that the calculations do not involve a summation of the properties of the solvent and solute.

In accordance with the invention, the liquid is subjected to the electric-field in combination with either the vector magnetic field B or scalar magnetic field B, to increase solubility of the solute in the liquid.

The same oscillating voltage frequency may be supplied to each antenna.

The phrase "out of phase" has the same meaning as "phase difference". As such, the voltage in each antenna has a phase difference relative to each other or is out of phase with each other.

The enclosure may define a conduit or a container in which the liquid flows, or is held.

The voltage may be generated as a modulated DC waveform.

The voltage may have a curved waveform in each antenna. Preferably, the voltage has a sinusoidal waveform. Alternatively, the voltage may have a square waveform.

The magnetic field value in the cyclotron resonance formula or Lorentz force formula may comprise the Earth's magnetic field. Preferably, the magnetic field value comprises the magnetic field value at the Earth's surface at the treatment location. The magnetic field value in the cyclotron resonance formula or Lorentz force formula may be the summation of the Earth's magnetic field with other magnetic field sources.

The antennae do not contact the liquid. Instead, the antennae may either be in close proximity to the enclosure holding the liquid or contact the enclosure holding the liquid.

The antennae of the liquid treatment device may be in the form of wires that can be wrapped around a liquid-containing enclosure, such as for example, a pipe. The antennae may also be connected to the enclosure using other attachment means.

The antennae used by the liquid treatment device do not contact the liquid to be treated during the treatment process. Instead, the antenna has to be in close proximity to the liquid such that the liquid is influenced by the generated electric-field.

The lowest frequencies used by the liquid treatment device may be about fifteen-fold lower than the fundamental cyclotron resonance frequencies for a solute or solvent.

The highest frequencies used by the liquid treatment device may be about one-thousand-fold higher than the fundamental cyclotron resonance frequency for a solute or solvent.

The antennae have little or no appreciable current flow as the electric-field is generated by creating a voltage difference between the two antennae. The direction of the voltage difference can change the direction of the electric-field vector. These allow the generation of an oscillating electric-field with little or no magnetic field and a changeable direction.

The oscillating electric-field frequency may be 300 kHz or less. Preferably, the oscillating electric-field frequency ranges from 0.3 Hz to 300 kHz.

The voltage waves may be 180° out of phase with each other.

The oscillating electric-field may be continuous and sequential. In this respect, the electric-field produced is continuous before changing to a different continuous frequency. Typically, a sequence comprising (i) a first continuous emission, followed by (ii) a frequency change and (iii) a second continuous emission that continues for a period ranging from 1 millisecond to 10 seconds. This frequency shift is followed by a series of additional frequency changes with each new frequency persisting for a period ranging from 1 millisecond to 10 seconds.

The liquid treatment device may include a magnetic field coil as a source of magnetic field. The magnetic field coil may be a closed coil (part of a closed circuit) and generates an electromagnetic field. In this embodiment, voltage in the magnetic field coil is a modulated DC waveform which is in the same phase as the waveform in one of the antennae.

The magnetic field coil may produce an electromagnetic field for locally modulating the oscillating electric-field generated by the antennae. Alternatively, the magnetic field coil may produce a pure magnetic field.

The magnetic field coil may be positioned between the two antennae.

The magnetic field coil, if present, does not contact the liquid. Instead, the magnetic field coil may either be in close proximity to the enclosure holding the liquid or contact the enclosure holding the liquid.

The magnetic field coil, if present, may be in the form of wires that can be wrapped around a liquid-containing enclosure, such as for example, a pipe. The magnetic field coil may also be connected to the enclosure using other attachment means. The magnetic field coil used by the liquid treatment device does not contact the liquid to be treated during the treatment process. Instead, the magnetic field coil has to be in close proximity to the liquid such that the liquid is influenced by the generated electromagnetic field.

Alternatively, the magnetic field coil may be wrapped around ferrous material that is positioned close to the liquid containing enclosure. In this embodiment, both the magnetic field coil and ferrous material used to carry a magnetic field do not contact the liquid to be treated during the treatment process. Instead, the magnetic field coil and ferrous material used to carry a magnetic field are in close proximity to the liquid such that the liquid is influenced by the generated magnetic field.

At least some portion of the magnetic field may be oriented perpendicular to the electric-field. This may maximise the force generated to aid dissolution of the solutes in the liquid.

Typically, the magnetic field coil produces a magnetic field having a strength that ranges from $1/100$ to $9/10$ of the Earth's magnetic field strength. The magnetic field of the magnetic field coil may be less than 500 µT. Preferably, the magnetic field strength ranges from 1 µT to 200 µT.

In an embodiment where the magnetic field coil is absent, the LTD relies on the earth's magnetic field only.

The magnetic field produced by the electromagnetic coil may be continuous and sequential. The electric and magnetic fields may vary in voltage with respect to each other.

The generator may employ an algorithm that utilises a set of frequencies in alternating and/or sequential fashion over a period of time.

In another form of the invention, there is provided a method of treating a liquid using a liquid treatment device including two antennae and a generator operatively connected to the two antennae including:

operating the generator to generate an oscillating voltage in each antenna wherein each voltage is out of phase with the other to create an oscillating electric-field; and subjecting the liquid to the electric-field in the presence of a magnetic field to change the chemical and/or physical properties of the solute, without the liquid contacting the two antennae.

Changing the chemical and/or physical properties of the solute may include any one or a combination of increasing solubility, increasing mobility or changing chemical reactivity of the solute in the liquid.

The method of treating a liquid may include a step of calculating the frequency of the oscillating voltage in each antenna, which is proportional to the strength of the magnetic field.

The method of treating a liquid may include a step of calculating the frequency of the oscillating voltage in each antenna that is proportional to the strength of the magnetic field; and operating the generator to generate the oscillating voltage in each antenna based on the frequency calculated.

The method of treating a liquid may include a step of calculating the frequency of the oscillating voltage in each antenna using a harmonic of the fundamental frequency of a solvent or solute, by using the cyclotron resonance harmonic formula:

$$f_{n+1} = (n+1) \cdot Bq/2\pi m$$

wherein $f_{n+1}$ is an overtone of fundamental frequency, B is the magnetic field strength, q is the solvent charge, solute charge or solvent dipole charge, m is the atomic/molecular mass of the solvent or solute and n equals zero or any whole number. In cases where n=0, the cyclotron resonance harmonic formula reduces to the cyclotron resonance formula.

The method of treating a liquid may include a step of calculating the frequency of the oscillating voltage in each antenna using the cyclotron resonance formula:

$$f = \frac{Bq}{2\pi m}$$

wherein scalar f is the frequency of the electric field modulation, scalar B is the magnetic field strength, scalar q is the solvent charge solute charge or solvent dipole charge, and m is the atomic/molecular mass of the solvent or solute.

The method of treating a liquid may include a step of calculating an agitation force that is a function of electric field strength, magnetic field strength and instantaneous velocity of an included solvent or solute particle.

The method of treating a liquid may include a step of calculating an agitation force using the Lorentz force formula:

$$F=|q|[E+(v \times B)]$$

wherein vector B is comprised of the instantaneous strength and direction of the magnetic field, scalar q is the solvent charge solute charge or solvent dipole charge, vector E is comprised of the strength and direction of the alternating electrical field alternating at any frequency, vector v is the instantaneous velocity of an included solvent or solute particle, vector F is the force acting on a charge q when q moves within coexisting electrical and magnetic fields, and vector F is at right angles to both vector B and vector E.

The method of treating a liquid may include a step of controlling the agitation force by changing any one or more of electric field strength, magnetic field strength and instantaneous velocity of an included solvent or solute particle.

BRIEF DESCRIPTION OF DRAWINGS

A preferred embodiment of the present invention is hereinafter described by way of example only, with reference to the accompanying drawings, wherein.

DETAILED DESCRIPTION

Figure 1:
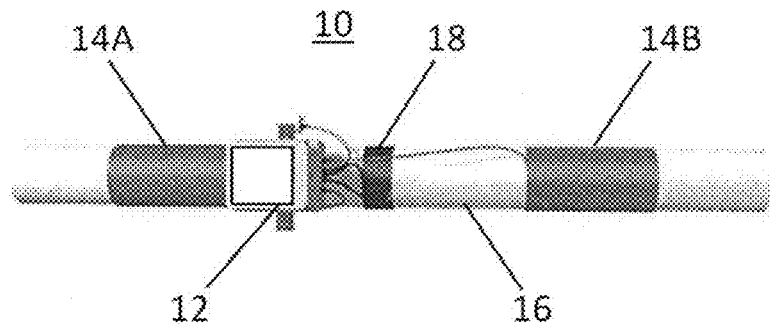
FIG. 1 is an isometric view of the liquid treatment device (LTD) according to one form of the present invention.

One aspect of liquid treatment device as defined by the invention is marked as 10 in FIG. 1.

The liquid treatment device comprises a generator 12 in communication with two antennae 14A and 14E for contacting a liquid-containing enclosure in the form of pipe 16.

The generator 12 generates a voltage having a sinusoidal or square waveform (FIG. 2) in each antenna to generate an oscillating electric-field having a frequency calculated using the cyclotron resonance harmonic formula:

$$f_{n+1}=(n+1) \cdot Bq/2\pi m$$

wherein $f_{n+1}$ is an overtone of fundamental frequency, B is the magnetic field strength, q is the solvent charge, solute charge or solvent dipole charge, m is the atomic/molecular mass of the solvent or solute and n equals zero or any whole number. In cases where n=0, the cyclotron resonance harmonic formula reduces to the cyclotron resonance formula.

Suitably, the generator 12 generates a voltage having a sinusoidal or square waveform in each antenna to generate an oscillating electric-field having a frequency calculated using the cyclotron resonance formula:

$$f = \frac{Bq}{2\pi m}$$

wherein scalar f is the frequency of the electric field modulation, scalar B is the magnetic field strength, scalar q is the solvent charge solute charge or solvent dipole charge, and m is the atomic/molecular mass of the solvent or solute.

The liquid may be subjected to an agitation force calculated using the Lorentz force formula:

$$F=|q|[E+(v \times B)]$$

wherein vector B is comprised of the instantaneous strength and direction of the magnetic field, scalar q is the solvent charge solute charge or solvent dipole charge, vector E is comprised of the strength and direction of the alternating electrical field alternating at any frequency, vector v is the instantaneous velocity (comprised of speed and direction) of an included solvent or solute particle, vector F is the force acting on a charge q when q moves within coexisting electrical and magnetic fields, and vector F is at right angles to both vector B and vector E.

The calculations using cyclotron resonance formula and the Lorentz force formula are made individually for each solvent or solute type and the calculations do not involve a solvent and a solute at the same time.

Typically, the electric-field frequency ranges from 0.3 Hz to 300 kHz. The voltage in each antenna is selected such that a voltage difference is created between the antennae to generate the electric-field used to treat the liquid.

The antennae 14A and 14B are the form of wires that are wrap-able around the pipe 16.

Although not bound by theory, it is believed that the liquid treatment device treats liquids using a physical treatment method, whereby no chemicals are used and no filtration is involved. The physical treatment method also does not involve electrolysis wherein electrodes contact the liquid to be treated.

It is also believed that the physical treatment process does not always chemically change molecules or ions as the process does not always cause electrons to move from molecule to molecule, or atom to atom.

The physical treatment method includes treatment methods involving subjecting the liquid to be treated with an electric-field and a magnetic field.

The present treatment method may also be considered an electronic treatment method because the present treatment method does not solely rely on a magnetic field to treat the liquid, and because an electronic circuit is used to generate an electric-field for treating the liquid.

An advantage of liquid treatment device 10 is that the liquid treatment device 10 can be used on existing pipes without having to modify the pipes, for example, openings do not have to be cut into the pipes to bring the antennae in contact with the liquid to be treated. This is because the liquid treatment device does not use electrolysis to treat the liquid and does not have to contact the liquid to be treated.

The antennae 14A and 14B produce little or no appreciable current flow and generate an oscillating electric-field by creating a voltage difference between the two antennae. This generates an electric-field without a magnetic field.

The advantage of having an oscillating electric-field as opposed to an oscillating electromagnetic field is that the magnetic field does not reverse each time the electrical field vector reverses in an oscillating electric-field.

Figure 2:
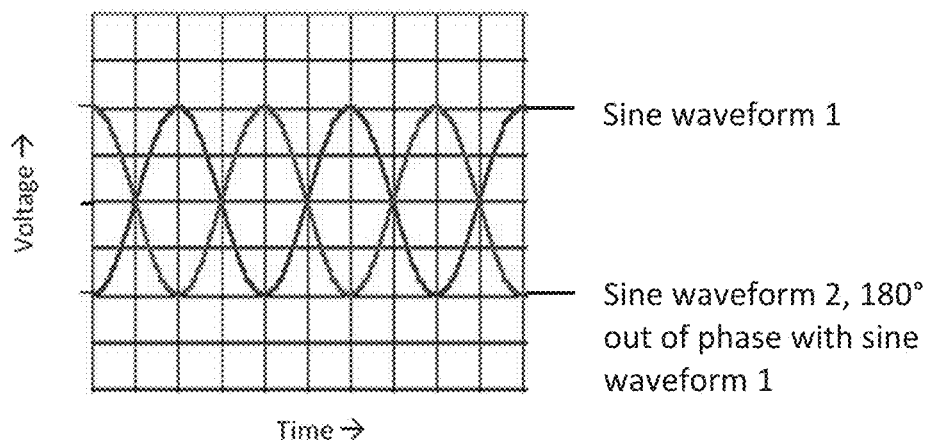
FIG. 2 is a representation of an oscilloscope screen with inputs being wired as to the two antennae, showing sinusoidal waveforms output by an LTD, and square waveforms output by an LTD respectively.
Figure 2:
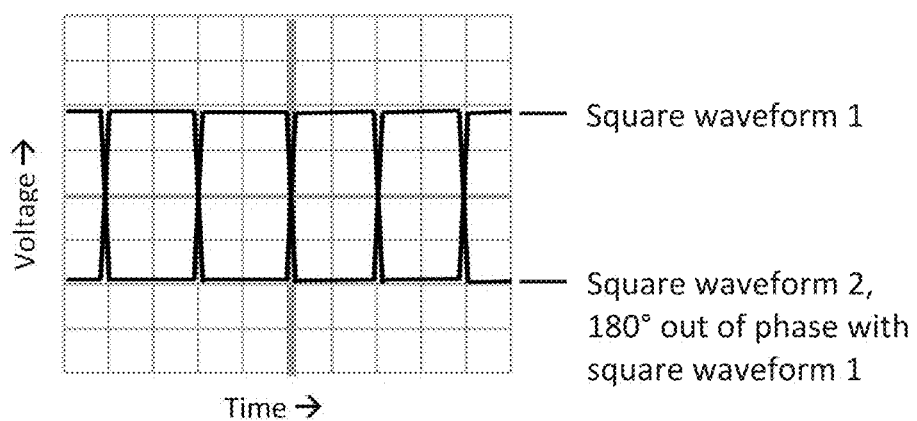

The voltage difference is generated by making the sinusoidal waveform of antenna 14A 180° out of phase with the sinusoidal wave of antenna 14B (FIG. 2). This allows the direction of the electric-field vector to reverse at a rate of microseconds to milliseconds.

The liquid treatment device 10 also includes a magnetic field coil 18 that produces a magnetic field component with a strength ranging from 1 µT to 200 µT.

The magnetic field coil produces an electromagnetic field that locally modulates the electric-field generated by the antennae at a position midway between the two antennae. Since the electric-field from the antennae is weakest at the point midway between the two antennae 14A and 14B, it is believed that this augmentation enhances the physical water treatment effects provided by the liquid treatment device.

The magnetic field coil 18 is positioned between the antennae 14A and 14B as shown in FIG. 1 but can alternatively be positioned anywhere along the pipe 16.

The magnetic field component of the magnetic field coil 18 changes its magnetic field strength in a series of steps over a recurring period. Alternatively, a single magnetic field strength may be generated by the coil. The magnetic field strength value(s) are used in the cyclotron resonance formula or the Lorentz force formula to calculate the required frequency of the electric-field, or to calculate the applied force of particle agitation, whereby magnetic field strength value in the cyclotron resonance formula or Lorentz force formula is the summation of the Earth's magnetic field strength and the magnetic field strength of the magnetic field coil.

In the absence of the magnetic field coil, the magnetic field strength value used to calculate the required frequency of the electric-field or the required force of the molecular agitation is the value of the Earth's magnetic field at the treatment location.

The electric and magnetic fields produced by the device 10 are continuous and sequential such that the fields are continuous for a period of time before changing to a different continuous frequency.

The direction of the electric-field vector is controlled by alternating the direction of the voltage difference between the two antennae 14A and 14B. A continuous sweep of frequencies is not used by the liquid treatment device 10. Instead, a set of fixed frequencies is applied one frequency at a time by the liquid treatment device, or alternatively a single frequency is applied by the liquid treatment device.

Typically, a sequence comprises (i) a first continuous emission, followed by (ii) a frequency change and (iii) a second continuous emission that continues for a period ranging from 1 millisecond to 10 seconds. This frequency shift is followed by a series of additional frequency changes, with each new frequency persisting for a period ranging from 1 millisecond to 10 seconds.

The treatment process involves targeting one type of solute (such as a mineral ion, for example, calcium) or one type of solvent (for example, water) at a time, to calculate an electric-field frequency to be applied to the liquid. This typically involves selecting and applying the targeted solute or solvent properties, such as its atomic/molecular mass and/or charge, by means of the cyclotron resonance formula or the Lorentz force formula.

A different solute or solvent is then targeted, to calculate another frequency to be applied to the liquid. This results in continuous frequencies being sequentially applied to the liquid and each frequency operates continuously for at least ten times the resonance time for the particular solute or solvent targeted.

The resonance time for a particular solute or solvent being targeted is obtained by inverting the cyclotron resonance frequency. For example, the resonance time for a 100 Hz frequency is 1/100th of a second, and the resonance time for a 500 Hz frequency is 2 milliseconds.

Typically, two molecules cannot be targeted at the same time by the liquid treatment device 10. However, this limitation can be overcome by using several pairs of antennae located sequentially along a pipe for instance.

However, more usually, the generator may employ an algorithm that utilises a set of frequencies in alternating fashion and/or in a sequential way over a period of time.

Alternatively, each frequency can be selected via a set of preprogrammed algorithms that calculate the frequency of the electric-field required to target a range of mineral ions by approximating the value of the Earth's magnetic field for a range of latitudes on the Earth's surface.

It is believed that the liquid treatment device increases dissolution of solutes such as minerals by improving hydration of individual mineral ions by water molecules.

It is also believed that the liquid treatment device can increase dissolution of uncharged solutes by improving hydration of individual uncharged solutes by water molecules. In this case, the dipole of the solute or the dipole of water molecules is targeted by the liquid treatment device.

A water molecule comprises a dipole comprised of a negatively charged oxygen atom and two positively charged hydrogen atoms. In the presence of mineral ions in solution, the charges on the water molecule orientate themselves to surround a corresponding mineral ion of opposite charge. Similarly, oppositely charged mineral ions are attracted to each other via these surrounding oriented water molecules when the mineral ions are present at moderate to high concentrations in water.

It is believed the solubility of mineral ions in solution decreases when the mineral ions are attracted to each other and aggregate.

Figure 3:
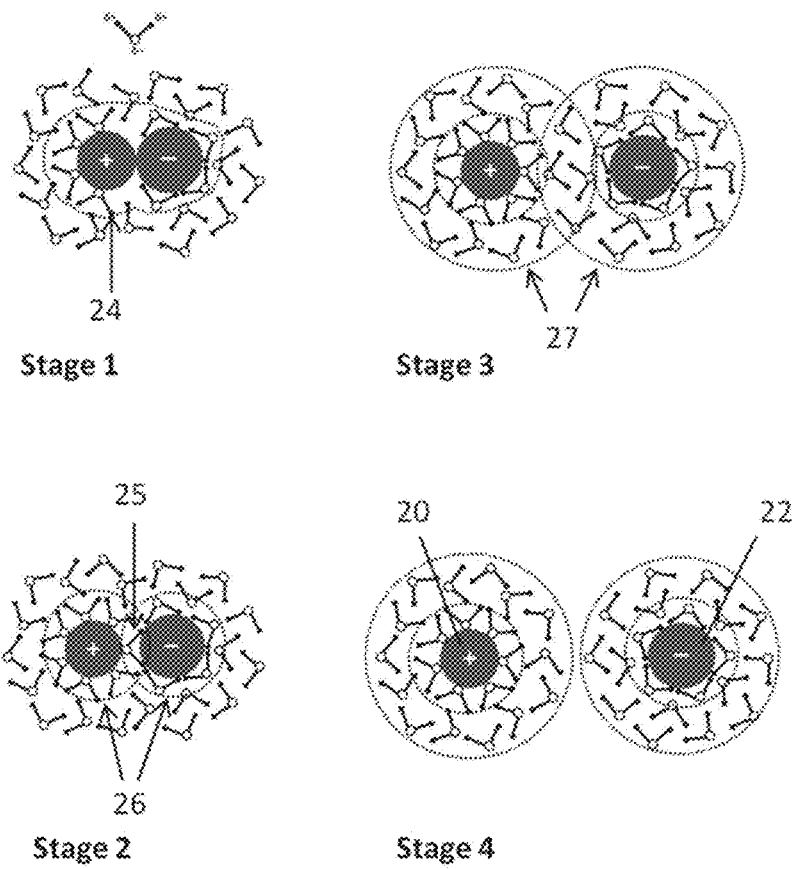
FIG. 3 is a schematic illustrating the stages of mineral ion hydration.

Not being bound by theory, it is believed that improved solubility of mineral ions 20 and 22 can be achieved by separating the oppositely charged mineral ions and hydrating each ion individually. The hydration process occurs in stages (FIG. 3). Each stage involves the successive hydration of mineral ions by water molecules.

FIG. 3 illustrates water molecules in close proximity to the mineral ions and their interaction with the ions. Water molecules in the bulk of the water are not illustrated in FIG. 3.

During the first stage, the water molecules are attracted to opposite charges on mineral ions in solution and physically attach to the mineral ions. A hydration shell 24 forms around the mineral ion pair (FIG. 3). This stage occurs naturally.

During the second stage, a water molecule moves between the mineral ions 20 and 22 (indicated by the arrow 25 in Stage 2 of FIG. 3). This results in a "solvent-shared" state whereby the water molecule that comes between the mineral ions is in contact with both mineral ions 20 and 22 (i.e. the water molecule 25 is "shared" between both mineral ions).

The initial hydration shell 26 of each ion is called the primary hydration shell. Water molecules in the primary hydration shell are more ordered (stable in position) than those in bulk water. This stage/process also occurs naturally.

During the third stage, additional water molecules move between the mineral ions 20 and 22 to create a secondary hydration shell 27 around each of the mineral ions. The secondary hydration shell contains water molecules that are more ordered than the water molecules in the bulk of the water, but less ordered than the water molecules in the primary hydration shell. Since the primary hydration shells of ions 20 and 22 are now separated and independent of each other, this is called the "solvent-separated" state. However, each of the secondary hydration shells still shares multiple water molecules with the other secondary hydration shell.

In the solvent-separated state, there is an indirect interaction between the mineral ions 20 and 22, via the dipoles of the water molecules. In effect, the charge on each mineral ion distributes outwards to the surface of its primary hydration shell 27. The interaction between the primary hydration shells also allows attraction between semi-ordered water molecules in the secondary hydration shells through hydrogen bonding. It is believed that these non-random interactions tend to keep secondary hydration shells in contact, in cases where mineral ions are present in medium or high concentrations. It is also believed that electronic water treatment provided by the liquid treatment device enhances the transition from the second stage to the third stage in FIG. 3, i.e. from the solvent-shared to the solvent-separated stage.

During the fourth stage, more water molecules move between the mineral ions 20 and 22 such that each mineral ion is fully hydrated and independent of each other. At this stage, neither the primary nor the secondary hydration shells of the ions interact. It is believed that electronic water treatment may affect the transition from the third stage to the fourth stage in FIG. 3.

The liquid treatment device accelerates one or more of the transitions from the second to third, or third to fourth stages by exploiting a phenomenon known as "ion cyclotron resonance" or alternatively a phenomenon that may be termed as Lorentzian agitation. The ion cyclotron resonance phenomenon is based on a principle that states that in the presence of an electric field of continually alternating polarity, the oscillation of a charge around a magnetic field line occurs at a fixed frequency proportional to the mass of the charge and the quantity of the charge.

The Lorentzian agitation principle is that in the presence of an electric field (EF) of continually alternating polarity (alternating at some frequency), an agitation force is applied to each charge in the field in proportion to the strength of that electric field and in proportion to the strength of the ambient or applied magnetic field, such that this agitation force occurs upon stimulation by EF of any frequency and that this force is independent of the mass of the charge. Nevertheless, a greater mass hence greater inertia of the charge can resist this agitation force. As such, small masses are more easily agitated by this force.

As well as various mineral ion charges and masses, the dipole charge of water can alternatively be used in the cyclotron resonance frequency formula, or in the Lorentz force formula. In such a case, the mass of the water molecule and the dipole charge of the water molecule are used in the cyclotron resonance (CR) formula, while only the dipole charge of the water molecule is used in the Lorentz force formula.

The partial charge on the oxygen atom in water is $-0.671e$ (where "e" is the absolute value of the charge on one electron or proton). The combined charge on the two hydrogen atoms in a water molecule is $+0.670e$. These are the charges comprising a water molecule dipole when the water molecule is not interacting with neighbouring water molecules.

The mass of the water molecule is used in the cyclotron resonance frequency formula for either of these charges, $0.670e$ or $0.671e$. The partial charges on two hydrogen atoms are combined ($0.335e+0.335e=0.67e$) to provide the partial charge on the non-oxygen end of the water molecule. Similarly if the Lorentz force formula is used, the charges $0.670e$ or $0.671e$ of the water molecule may be used in it. It is believed that the spontaneous orientation of the dipole of a water molecule may be affected by the concurrent presence of an electric field and a magnetic field. These fields may initiate such reorientation of water molecules rather than being the sole cause of such reorientation. It is further believed that water molecules proximal to solutes may respond to these fields differently compared to water molecules in bulk water. It is also believed that water molecules in the primary hydration shell of a solute may respond to the fields differently to water molecules in the secondary hydration shell of a solute.

Alternatively, the electric-field frequency produced by the invention may be continuous before changing to a different continuous frequency. For example (i) a first continuous frequency may target a mineral ion, then (ii) a frequency change may occur, and then (iii) a second continuous frequency may target the water dipole. This may be cyclical/iterative, or may progress to a third and a fourth frequency (up to a maximum of 100 continuous frequencies) targeting different solutes and or solvents. The sequence is always iterative except when only a single frequency is used. Typically, a frequency targeting one mineral ion, will be followed by a frequency targeting a water dipole, and then an frequency targeting the same or a different mineral ion, and then again the water dipole, and the sequence continues iteratively. This can be elaborated for complex mixtures of ions.

Figure 4:
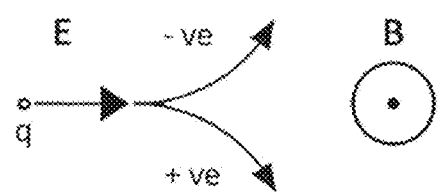
FIG. 4 is a schematic illustrating the movement of oppositely charged mineral ions when placed in electric and magnetic fields.

To apply cyclotron resonance and/or Lorentzian agitation, an electric-field is generated by creating a voltage difference between the two antennae. Under the influence of magnetic and electric fields oriented perpendicular to each other, or when some component of the magnetic and electric field vectors are oriented perpendicular to each other, mineral ions of opposite charge are teased apart as they are forced to move in opposite directions (FIG. 4). In this respect, the liquid treatment device 10 provides a tunable electric-field based on the cyclotron resonance formula and/or the Lorentz force formula. Mineral ions that are teased apart by the water treatment device may increase their hydration state by moving from Stage 2 to Stage 3, or from Stage 3 to Stage 4.

Figure 5:
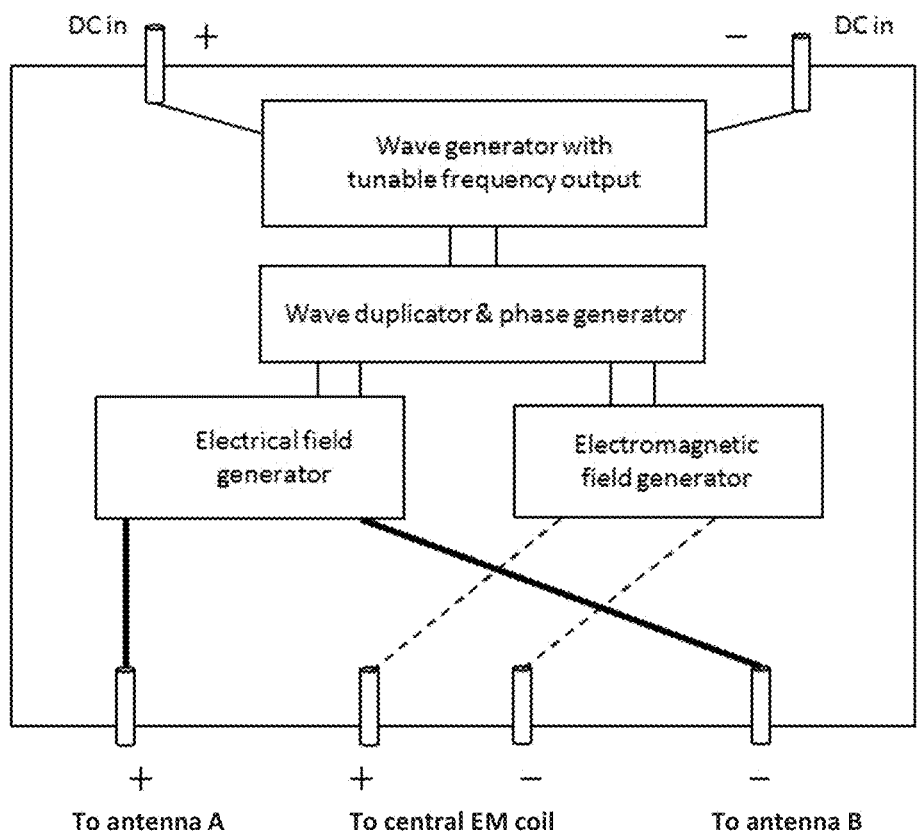
FIG. 5 is a schematic of a circuit driving an LTD.

In order to ensure that optimal effect of a field influencing a solute or solvent, the waveform supplied to the magnetic field coil of the LTD is generated by the same generator that supplies the antennae of the LTD (FIG. 5). This ensures that the frequency of the magnetic field coil waveform is the same as the frequency of the antennae waveform. This also ensures that the phase of the magnetic field coil is the same as that of one of the antennae.

Alternatively, the magnetic field coil may be disconnected if it is desired that only the earth's magnetic field should interact with the electric field from the LTD.

Figure 6:
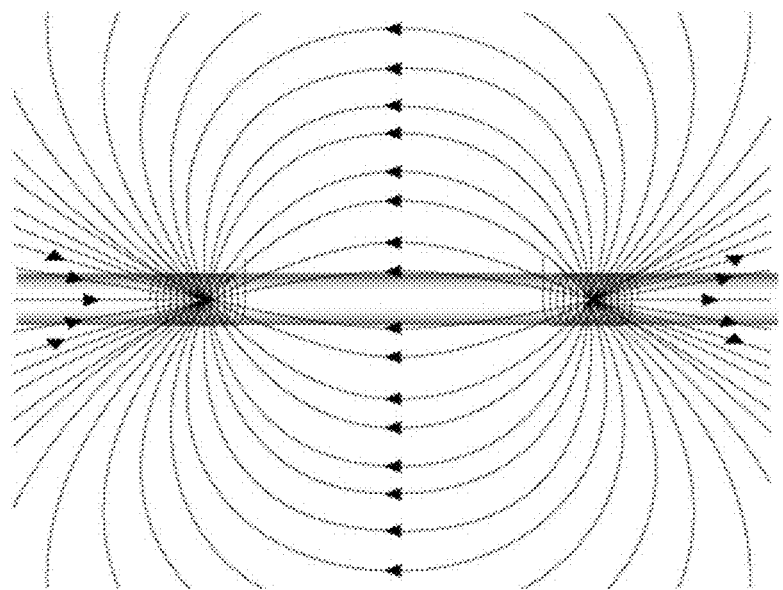
FIG. 6 is a representation of the electrical fields produced by the antennae of the LTD.
Figure 7:
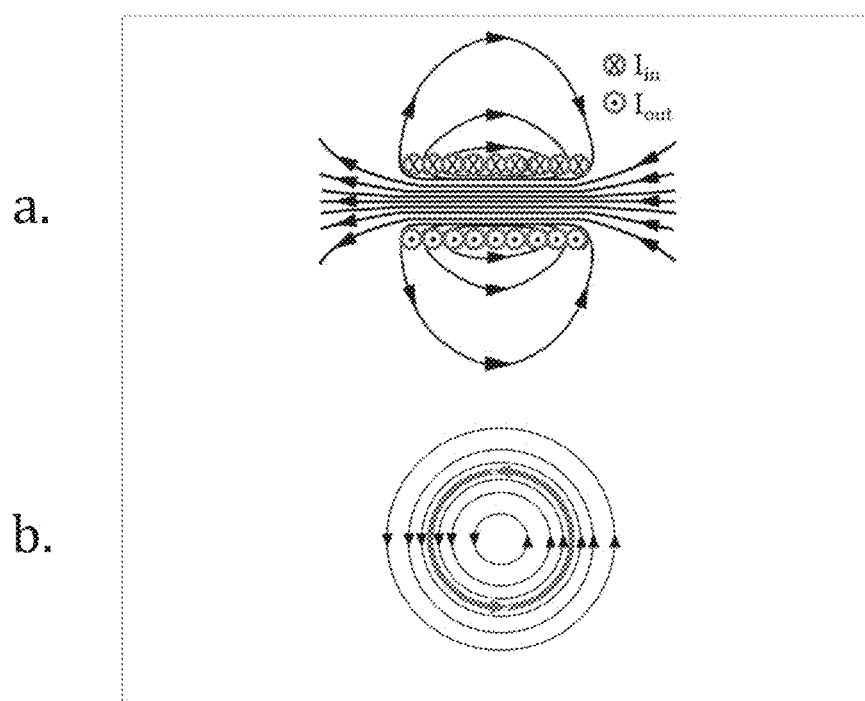
FIGS. 7a and 7b is a representation of the magnetic and electrical fields produced by the magnetic field coil of the LTD.

Field models for the liquid treatment device are described in FIG. 6 and FIGS. 7a and 7b. A longitudinal section of the electrical field emitted by two helical antennae is shown in FIG. 6, with field lines that are closest together representing greatest field strength. The central electromagnetic (closed) coil is omitted in FIG. 6 for clarity.

In FIG. 6, the strength of the electrical field is of greatest intensity at two centres, with each centre located mid-loop and inside the pipe at its cross-sectional centre. The electrical field is generated when both antennae are operating. The field disappears if one antenna is disconnected. It is believed that an interaction between the electric field and the earth's magnetic field may occur independent of the orientation of the LTD because at least one component of the electrical field would be perpendicular to the earth's magnetic field at most locations within the pipe on which the antennae is wound due to the heterogeneous shape of the electrical field.

A longitudinal section of the magnetic field emitted by the central closed coil is shown in FIG. 7a. The wire in the magnetic coil carries a current that is represented, in two concurrent aspects, by the fletchings and arrow tips convention, which describe current flow into and out of the page respectively. A cross section of the electrical field emitted by the central closed coil is shown in FIG. 7b. Also in FIG. 7b, current is shown in a thicker line than the electrical field.

In addition to mitigating against scale formation by improving dissolution of mineral ions in the liquid as discussed above, the liquid treatment device can also remove existing scale from pipes. It is believed that the hydrated ions generated by the liquid treatment device scavenge bound particles from the scale layer. As such, as the hydrated ions traverse the pipe, particles from the scale layer move into solution and cause the scale layer to become more porous. This increase in porosity also increases the surface area of the scale layer exposed to the hydrated ions which in turn improves dissolution of the scale layer into the liquid.

The liquid treatment device may be applied to a membrane to improve efficiency of the reverse osmosis (RO) process during desalination. Reverse osmosis involves forcing water through molecular sized holes which exclude larger particles such as hydrated salts and other impurities.

Sea water is often the feed material for reverse osmosis processes. Typically, for every 1 litre of desalinated water that emerges from a reverse osmosis process, another 1 litre (or up to 4 litres) of hypersaline wastewater also emerges. A limitation on the efficiency of a reverse osmosis process is that there is a buildup of precipitated salts on the membrane, gradually lowering the flow of desalinated water that can emerge.

The liquid treatment device may be used to treat the saline water before the saline water reaches the membrane to improve the efficiency of the reverse osmosis process and/or improve the quality of the drinking water that results.

The liquid treatment device may also be used to treat the drinking water that results from first stage reverse osmosis, just before subjecting the first stage RO water to a second reverse osmosis membrane/process, to decrease its salinity further. The efficiency improvements gained may consist of any one or more of the following: altered reject rate, or change (such as lowering) in pressure required, or increase in rate at which permeate is produced, or decreases in salinity of permeate.

The liquid treatment device can also be used in agriculture to provide one or more advantages including increasing growth in crops, conferring salt tolerance, maximizing marketability, and increasing the porosity of soils. This is achieved by minimising precipitation of these minerals borewater used to irrigate the crops to increase the amount of minerals available to be absorbed by crops.

Additionally, if fertiliser is added to water during irrigation, the fertiliser/water mixture may be treated using the liquid treatment device before irrigating the plants with the solution. In this way, the hydration state of the fertiliser, and thus its availability to plants, can be maximised.

The liquid treatment device may also be used to change the ecological balance in an aquatic environment, for example, changing the dominance of one bacterial or planktonic type over another.

The liquid treatment device can also be used to maintain swimming pools by allowing the concentration of chemicals used, in particular chlorine, to be reduced. Further uses include moving sludge more efficiently through pipes in mining operations and facilitating mineral or ore extraction by replacing or augmenting chemical use in mining or leaching operations.

Example 1

A hydroponics medium treated using the liquid treatment device was used to grow two varieties of lettuce (Green Butterhead and Lollo Rossa) to demonstrate the effect of the treated medium on the growth of the lettuce. The cyclotron resonance formula was used to specify particular frequencies for the LTD, targeting particular solutes and solvent, Materials and Methods Seedlings were raised in standard Grodan rockwool propagation cubes and given a dilute nutrient solution (distilled water+hydroponic nutrients) for the first 4 weeks of growth. Seedlings of both varieties were then transplanted into separate nutrient film technique (NFT) systems for each of the 3 treatments (Experiments 1A-1C).

There were 15 Lollo Rossa plants and 18 Green Butterhead plants per treatment. For each treatment, plants were grown in 3 channels, comprising 3 pseudoreplications (3 treatments×3 channels=9 channels in total).

Each individual treatment utilises an NFT system comprised of tanks, pump, channels and return pipes. Each experiment was isolated from all other experiments. The water used in this trial was prepared on site to simulate 'hard' high salinity borewater (the simulated medium hereafter called "borewater"). The borewater used to make up the hydroponic nutrient solution was formulated to replicate a moderately severe, hard, high salinity water source and was based on a well (bore) water analysis from the Capertee Valley, Australia which was classified as being unsuitable for irrigation. The borewater was prepared by adding the following salts to rainwater (g/l)

boric acid (0.0008)
calcium carbonate (0.15)
iron sulphate (0.0024)
potassium sulphate (0.0724)
magnesium sulphate (1.5)
sodium bicarbonate (2.4808)
sodium chloride (1.1668)
calcium sulphate (0.4292)

This borewater had a TDS of 3,900 an EC of 5.82 mS/cm, pH of 8.5. When analysed, the borewater had total levels of (mg/l):

Na (1,150)
Cl (960)
Ca (66)
Mg (128)
carbonate (22)
bicarbonate (1,640)

The borewater would be considered unusable for hydroponic lettuce production. All borewater was treated by UV sterilisation before making up the nutrient solutions.

A digital CR frequency generator (circuit board) was used to set up a modulated electrical field to treat the hydroponics medium. During plant growth, the electrical conductivity (EC) and pH of each treatment solution was adjusted as required. Bore water containing hydroponic nutrients was used to top up each of the treatment tanks as required to replace water lost from the system due to events such as plant uptake and evaporation.

All borewater used was supplemented with hydroponic nutrient solution Matrix Blue (Suntec, Tokomaru NZ) at a ratio of 1 part Matrix Blue per 200 parts of borewater.

Matrix Blue comprises the following components: calcium nitrate, potassium nitrate, monopotassium phosphate, magnesium sulfate, iron EDTA, manganese sulfate, zinc sulfate, boric acid, copper sulfate, ammonium molybdate, nickel sulfate, cobalt sulfate, potassium iodide, potassium dichromate, and sodium selenite.

The analysis of a 1:200 dilution of Matrix Blue in rainwater provides the following concentrations (mg/l): N (150), P (42.5), K (175), Mg (37.5), Ca (140), S (49.5), Fe (2.5), Mn (1.5), Zn (0.20), B (0.35), Cu (0.035), Mo (0.025), Co (0.0225), Ni (0.018), Cr (0.0075), I (0.0055), Se (0.0019).

All experiments started with a hydroponic medium EC of 6.6 mS/cm. This comprised of EC 5.82 mS/cm from the bore water and EC 0.8 mS/cm from hydroponic nutrients. At trial completion (7 weeks), the EC range was 11-12 mS/cm. The EC increased gradually over the course of the trial, allowing the plants to adjust to the increasing osmotic pressure during this period of growth.

The EC level increased over time as salts that were not taken up by the plants accumulate in solution. Nitric and phosphoric acid (ratio of 50/50) was used to adjust pH as required to maintain a pH of 5.8-6.5.

Control experiment 1A assayed the growth of lettuce in untreated hydroponic medium. Experiment 1B assayed the growth of lettuce in a CR treated hydroponic medium using a liquid treatment device (LTD) excluding a magnetic field coil. Experiment 1C assayed the growth of lettuce in a CR treated hydroponic medium using a LTD including a magnetic field coil. In experiments 1B and 1C, the LTD was programmed to target the following atoms or molecules in the following order: $Cl^-$, $H_2O$, $H_3O_2^-$ (hydroxide hydrate), $H_2O$, $CO_3^{2-}$, $H_2O$, $Fe^{2+}$, $H_2O$, $Na^+$, $H_2O$, $Ca^{2+}$, $H_2O$, $Fe^{3+}$, $H_2O$, $OH^-$, $H_2O$, $O^-$, $H_2O$, $Mg^{2+}$. Atoms and molecules in bore water medium were targeted rather than atoms and molecules in the nutrient mix. In Experiments 1B and 1C, at the conclusion of the series of frequencies, the LTD program returned to the first CR frequency and repeated the series, such that the series of CR frequencies was cyclic. The LTD used in Experiments 1B and 1C, was programmed with these frequencies by using the CR formula, and substituting the earth's magnetic field value at the test site (Tokomaru NZ) as B.

During the trials, experiments 1A, 1B and 1C were run simultaneously under identical environmental conditions. Each lettuce variety was judged on weight, the presence of tipburn, marketability and leaf mineral content.

Once the crop matured, the plants were harvested, weighed to determine fresh weight and assessed for marketability and tipburn.

Foliar samples were sent for mineral analysis. Foliar analysis was done on mixed lettuce, combining Butterhead and Lollo Rossa samples. For control and for each LTD, foliar analysis was done in triplicate.

Results

TABLE 1

Green Butterhead (Cultivar: Fabietto RZ)

| Expt. | Treatment | Fresh weight (mean) (g) | Marketability[a] (% of crop) | Reason for damage | Tipburn mean value[b] |
|---|---|---|---|---|---|
| 1A | Control | 189.7 ± 8.4 | 0 | Tipburn | 4.8 ± 0.1 |
| 1B | LTD without magnetic field coil | 297.4 ± 8.9 | 11 | Tipburn | 1.6 ± 0.2 |

TABLE 1-continued

Green Butterhead (Cultivar: Fabietto RZ)

| Expt. | Treatment | Fresh weight (mean) (g) | Marketability[a] (% of crop) | Reason for damage | Tipburn mean value[b] |
|---|---|---|---|---|---|
| 1C | LTD including magnetic field coil | 309.1 ± 8.0 | 28 | Tipburn | 1.1 ± 0.2 |

[a]Marketability indicates the percentage of lettuce acceptable for commercial sale.
[b]Tipburn mean value indicates the degree of tipburn on a scale of 0 to 5 (0 = no tipburn; 5 = severe tipburn).

TABLE 2

Lollo Rossa (Cultivar: Sunsun Red Frill)

| Expt. | Treatment | Fresh weight (mean) (g) | Marketability[a] (% of crop) | Reason for damage | Tipburn mean value[b] |
|---|---|---|---|---|---|
| 1A | Control | 132.5 ± 5.6 | 34 | Tipburn | 1.3 ± 0.3 |
| 1B | LTD without magnetic field coil | 205.4 ± 4.8 | 67 | Tipburn | 0.7 ± 0.2 |
| 1C | LTD including magnetic field coil | 219.1 ± 4.7 | 80 | Tipburn | 0.2 ± 0.1 |

[a]Marketability indicates the percentage of lettuce acceptable for commercial sale.
[b]Tipburn mean value indicates the degree of tipburn on a scale of 0 to 5 (0 = no tipburn; 5 = severe tipburn).

TABLE 3

Foliar Mineral Levels - Butterhead & Lollo Rossa mixed lettuce

| Element | Experiment 1A | Experiment 1B | Experiment 1C |
|---|---|---|---|
| Boron (mg/kg) | 28.67 ± 0.72 | 39.67 ± 0.98 | 35.00 ± 2.49 |
| Calcium (%) | 0.11 ± 0.01 | 0.21 ± 0.01 | 0.36 ± 0.02 |
| Magnesium (%) | 0.28 ± 0.01 | 0.45 ± 0.01 | 0.42 ± 0.02 |
| Manganese (mg/kg) | 102.33 ± 3.14 | 205.67 ± 7.98 | 145.00 ± 10.87 |

Tables 1 and 2 provide information on the properties of the two lettuce varieties used during the trials of Example 1.

A comparison of the results between Experiment 1A and either Experiment 1B or 1C indicates that CR treatment of the hydroponic medium is beneficial to hydroponic lettuce growth.

A comparison between Experiment 1B and 1C also indicates that the LTD with a magnetic field coil improves the measured properties of the lettuce compared to lettuce grown using hydroponic medium treated with a LTD without the magnetic field coil.

Additionally, Table 3 provides the foliar mineral levels of selected elements from a mixed sample of Green Butterhead and Lollo Rossa. It was observed that the boron, calcium, magnesium and manganese content of the lettuce grown using hydroponic medium treated with the LTD (Experiment 1B and 1C) had increased relative to the content of these elements in the control lettuce grown in medium not treated by the LTD (Experiment 1A). It was also shown that the calcium content in lettuce grown using hydroponic medium treated with a LTD including a magnetic field coil (Experiment 1C) was greater than lettuce grown using hydroponic medium treated with a LTD without a magnetic field coil (Experiment 1B).

Example 2

A hydroponics medium treated using the liquid treatment device was used to grow two varieties of lettuce (Green Butterhead and Lollo Rossa) to demonstrate the tunability of a cyclotron resonance LTD via the LTD's effect on the yield and quality of the lettuce grown in the treated medium. Cyclotron resonance frequencies programmed into the LTD were tuned to the water alone, or to the minerals alone, or to both the water and minerals in combination. These three treatments were compared to an untreated control.

Materials and Methods

Seedlings were raised in standard Grodan rockwool propagation cubes and given a dilute nutrient solution (distilled water+hydroponic nutrients) for the first 4 weeks of growth. Seedlings of both varieties were then transplanted into separate nutrient film technique (NFT) systems for each of the 4 treatments (Experiments 2A-2D).

There were 15 Lollo Rossa plants and 18 Green Butterhead plants per treatment. For each treatment, plants were grown in 3 channels, comprising 3 pseudoreplications (4 treatments×3 channels=12 channels in total).

Each individual treatment utilises an NFT system comprised of tanks, pump, channels and return pipes. Each experiment was isolated from all other experiments. The water used in this trial was prepared on site to simulate 'hard' high salinity borewater (the simulated medium hereafter called "borewater"). The borewater used to make up the hydroponic nutrient solution was formulated to replicate a moderately severe, hard, high salinity water source and was based on a well (bore) water analysis from the Capertee Valley, Australia which was classified as being unsuitable for irrigation. The borewater was prepared by adding the following salts to rainwater (g/l):

boric acid (0.0008)
calcium carbonate (0.15)
iron sulphate (0.0024)
potassium sulphate (0.0724)
magnesium sulphate (1.5)
sodium bicarbonate (2.4808)
sodium chloride (1.1668)
calcium sulphate (0.4292)

This borewater had a TDS of 3,900 g/l, an EC of 5.82 mS/cm, pH of 8.5. When analysed, the borewater had total levels of (mg/l):

Na (1,150)
Cl (960)
Ca (66)
Mg (128)
carbonate (22)
bicarbonate (1,640)

The borewater would be considered unusable for hydroponic lettuce production. All borewater was treated by UV sterilisation before making up the nutrient solutions.

A digital CR frequency generator (circuit board) was used to set up a modulated electrical field to treat the hydroponics medium. During plant growth, the electrical conductivity (EC) and pH of each treatment solution was adjusted as required. Bore water containing hydroponic nutrients was used to top up each of the treatment tanks as required to replace water lost from the system due to events such as plant uptake and evaporation.

All borewater used was supplemented with hydroponic nutrient solution Matrix Blue (Suntec, Tokomaru NZ) at a ratio of 1 part Matrix Blue per 200 parts of borewater.

Matrix Blue comprises the following components: calcium nitrate, potassium nitrate, monopotassium phosphate, magnesium sulfate, iron EDTA, manganese sulfate, zinc sulfate, boric acid, copper sulfate, ammonium molybdate, nickel sulfate, cobalt sulfate, potassium iodide, potassium dichromate, and sodium selenite.

The analysis of a 1:200 dilution of Matrix Blue in rainwater provides the following concentrations (mg/l): N (150), P (42.5), K (175), Mg (37.5), Ca (140), S (49.5), Fe (2.5), Mn (1.5), Zn (0.20), B (0.35), Cu (0.035), Mo (0.025), Co (0.0225), Ni (0.018), Cr (0.0075), I (0.0055), Se (0.0019).

All experiments started with a hydroponic medium EC of 6.6 mS/cm. This comprised of EC 5.82 mS/cm from the bore water and EC 0.8 mS/cm from hydroponic nutrients. At trial completion (6 weeks), the EC range was 9.7-10 mS/cm. The EC increased gradually over the course of the 6 week trial, allowing the plants to adjust to the increasing osmotic pressure during this period of growth.

The EC level increased over time as salts that were not taken up by the plants accumulate in solution. Nitric and phosphoric acid (ratio of 50/50) was used to adjust pH as required to maintain a pH of 5.8-6.5.

Control experiment 2A assayed the growth of lettuce in untreated hydroponic medium. Experiment 2B assayed the growth of lettuce in a CR treated hydroponic medium using a liquid treatment device (LTD) targeting minerals. Experiment 2C assayed the growth of lettuce in a CR treated hydroponic medium using a LTD targeting water. Experiment 2D assayed the growth of lettuce in a CR treated hydroponic medium using a LTD targeting minerals and water. In Experiment 2B, the LTD was programmed to target the following atoms or molecules in the following order: $Cl^-$, $CO_3^{2-}$, $Fe^{2+}$, $Na^+$, $Ca^{2+}$, $Fe^{3+}$, $Mg^{2+}$. Minerals in bore water medium were targeted rather than minerals in the nutrient mix. In Experiment 2C, the LTD was programmed to target water only, specifically targeting the water dipole. In Experiment 2D, the LTD was programmed to target water (as the water dipole) and minerals/ions, specifically in the following order: Cl—, $H_2O$, $H_3O_2^-$ (hydroxide hydrate), $H_2O$, $CO_3^{2-}$, $H_2O$, $Fe^{2+}$, $H_2O$, $Na^+$, $H_2O$, $Ca^{2+}$, $H_2O$, $Fe^{3+}$, $H_2O$, $OH^-$, $H_2O$, $O^-$, $H_2O$, $Mg^{2+}$, $H_2O$. In Experiments 2B and 2D, at the conclusion of the series of frequencies, the LTD program returned to the first CR frequency and repeated the series, such that the series of CR frequencies was cyclic. The LTD used in Experiments 2B, 2C and 2D, was programmed with these frequencies using the CR formula, and substituting the earth's magnetic field value at the test site (Tokomaru NZ) as B.

During the trials, Experiments 2A, 2B 2C and 2D were run simultaneously under identical environmental conditions. Each lettuce variety was judged on weight, the presence of tipburn, marketability and leaf mineral content.

Once the crop matured, the plants were harvested, weighed to determine fresh weight and assessed for marketability and tipburn. Foliar samples were sent for mineral analysis. Foliar analysis was done on Butterhead samples and separately on Lollo Rossa samples. For the controls and also for each LTD, foliar analysis was done in triplicate.

Results

TABLE 4

| | Green Butterhead (Cultivar: Fabietto RZ) | | | | |
|---|---|---|---|---|---|
| Expt. | Treatment | Fresh weight (mean) (g) | Marketability[a] (% of crop) | Reason for damage | Tipburn mean value[b] |
| 2A | Control | 159.2 ± 4.1 | 50 | Tipburn | 0.67 ± 0.21 |
| 2B | LTD targeting Minerals | 157.4 ± 8.0 | 94 | Tipburn | 0.06 ± 0.05 |

TABLE 4-continued

Green Butterhead (Cultivar: Fabietto RZ)

| Expt. | Treatment | Fresh weight (mean) (g) | Marketability[a] (% of crop) | Reason for damage | Tipburn mean value[b] |
|---|---|---|---|---|---|
| 2C | LTD targeting Water | 167.3 ± 6.2 | 78 | Tipburn | 0.33 ± 0.16 |
| 2D | LTD targeting Minerals and Water | 190.3 ± 8.6 | 72 | Tipburn | 0.39 ± 0.18 |

[a]Marketability indicates the percentage of lettuce acceptable for commercial sale.
[b]Tipburn mean value indicates the degree of tipburn on a scale of 0 to 5 (0 = no tipburn; 5 = severe tipburn).

TABLE 5

Lollo Rossa (Cultivar: Sunsun Red Frill)

| Expt. | Treatment | Fresh weight (mean) (g) | Marketability[a] (% of crop) | Reason for damage | Tipburn mean value[b] |
|---|---|---|---|---|---|
| 2A | Control | 103.0 ± 2.4 | 100 | NA | 0 |
| 2B | LTD targeting Minerals | 106.1 ± 7.1 | 100 | NA | 0 |
| 2C | LTD targeting Water | 106.1 ± 4.3 | 100 | NA | 0 |
| 2D | LTD targeting Minerals and Water | 154.4 ± 4.8 | 100 | NA | 0 |

[a]Marketability indicates the percentage of lettuce acceptable for commercial sale.
[b]Tipburn mean value indicates the degree of tipburn on a scale of 0 to 5 (0 = no tipburn; 5 = severe tipburn).

TABLE 6

Foliar Mineral Levels - Green Butterhead (Cultivar: Fabietto RZ)

| Element | 2A: Control | 2B: An LTD targeting Minerals | 2C: An LTD targeting Water | 2D: An LTD targeting Minerals and Water |
|---|---|---|---|---|
| Nitrogen (%) | 4.07 ± 0.11 | 4.80 ± 0.05 | 4.53 ± 0.10 | 4.60 ± 0.12 |
| Phosphorus (%) | 0.45 ± 0.01 | 0.70 ± 0.01 | 0.79 ± 0.02 | 0.64 ± 0.02 |
| Boron (mg/kg) | 31.0 ± 1.41 | 35.7 ± 1.19 | 37.0 ± 1.41 | 43.00 ± 0.47 |
| Calcium (%) | 0.42 ± 0.02 | 0.63 ± 0.01 | 0.72 ± 0.03 | 0.75 ± 0.01 |
| Iron (mg/kg) | 47.0 ± 0.82 | 67.0 ± 2.49 | 72.0 ± 3.30 | 56.33 ± 2.60 |
| Potassium (%) | 5.93 ± 0.28 | 6.87 ± 0.19 | 6.83 ± 0.17 | 7.17 ± 0.18 |
| Magnesium (%) | 0.30 ± 0.02 | 0.40 ± 0.01 | 0.46 ± 0.01 | 0.49 ± 0.01 |
| Manganese (mg/kg) | 92.3 ± 7.81 | 136.7 ± 2.42 | 162.0 ± 2.16 | 230.0 ± 9.43 |
| Sodium (%) | 1.56 ± 0.17 | 1.95 ± 0.13 | 1.94 ± 0.11 | 1.94 ± 0.05 |
| Zinc (mg/kg) | 51.7 ± 1.44 | 62.3 ± 1.44 | 59.7 ± 1.52 | 47.00 ± 0.47 |

TABLE 7

Foliar Mineral Levels - Lollo Rossa (Cultivar: Sunsun Red Frill)

| Element | 2A: Control | 2B: An LTD targeting Minerals | 2C: An LTD targeting Water | 2D: An LTD targeting Minerals and Water |
|---|---|---|---|---|
| Nitrogen (%) | 3.73 ± 0.07 | 4.30 ± 0.08 | 4.23 ± 0.10 | 4.00 ± 0.12 |
| Phosphorus (%) | 0.40 ± 0.02 | 0.61 ± 0.01 | 0.71 ± 0.01 | 0.57 ± 0.00 |
| Boron (mg/kg) | 35.33 ± 2.42 | 38.33 ± 1.19 | 38.00 ± 1.25 | 42.33 ± 0.27 |
| Calcium (%) | 0.42 ± 0.03 | 0.47 ± 0.03 | 0.57 ± 0.01 | 0.54 ± 0.01 |
| Iron (mg/kg) | 38.67 ± 1.91 | 68.33 ± 3.31 | 75.00 ± 6.24 | 62.33 ± 3.57 |
| Potassium (%) | 7.17 ± 0.28 | 8.57 ± 0.28 | 8.20 ± 0.09 | 8.07 ± 0.07 |
| Magnesium (%) | 0.31 ± 0.02 | 0.28 ± 0.01 | 0.31 ± 0.00 | 0.32 ± 0.01 |
| Manganese (mg/kg) | 138.3 ± 15.5 | 148.7 ± 5.9 | 201.0 ± 7.35 | 306.7 ± 7.20 |
| Sodium (%) | 1.21 ± 0.14 | 1.73 ± 0.13 | 1.86 ± 0.06 | 1.47 ± 0.02 |
| Zinc (mg/kg) | 46.33 ± 1.44 | 57.67 ± 0.72 | 55.67 ± 1.19 | 42.00 ± 0.47 |

Tables 4 and 5 provide information on the properties of the two lettuce varieties used during the trials of Example 2.

A comparison of the results between Experiment 2A and any of Experiments 2B, 2C or 2D indicates that targeted CR treatment of the hydroponic medium is beneficial to hydroponic lettuce growth, measured as fresh weight.

A comparison between Experiment 2D and either 2B or 2C also indicates that the LTD targeting both minerals and water improves the fresh weight of the lettuce compared to lettuce grown using hydroponic medium treated with a LTD targeting only minerals, or treated with an LTD targeting water alone.

Additionally, Tables 6 and 7 provide the foliar mineral levels of selected elements from Green Butterhead and Lollo Rossa lettuce respectively in Example 3. It was observed that the nitrogen, phosphorus, boron, calcium, iron, potassium, manganese and sodium content of the lettuce grown using hydroponic medium treated with the LTD (Experiments 2B, 2C and 2D) had increased over the control (Experiment 2A).

Example 3

A hydroponics medium treated using the liquid treatment device was used to grow two varieties of lettuce (Green Butterhead and Lollo Rossa) to demonstrate the effect of a square wave LTD on the growth of the lettuce via the treated medium. Lorentzian agitation was relied on to broadly target all solutes and the solvent.

Materials and Methods

Seedlings were raised in standard Grodan rockwool propagation cubes and given a dilute nutrient solution (distilled water+hydroponic nutrients) for the first 6 weeks of growth. Seedlings of both varieties were then transplanted into separate nutrient film technique (NFT) systems for each of the 3 treatments (Experiments 3A-3C).

There were 15 Lollo Rossa plants and 18 Green Butterhead plants per treatment. For each treatment, plants were grown in 3 channels, comprising 3 pseudoreplications (3 treatments×3 channels=9 channels in total).

Each individual treatment utilises an NFT system comprised of tanks, pump, channels and return pipes. Each experiment was isolated from all other experiments. The water used in this trial was prepared on site to simulate 'hard' high salinity borewater (the simulated medium hereafter called "borewater"). The borewater used to make up the hydroponic nutrient solution was formulated to replicate a moderately severe, hard, high salinity water source and was based on a well (bore) water analysis from the Capertee Valley, Australia which was classified as being unsuitable for irrigation. The borewater was prepared by adding the following salts to rainwater (g/l):

boric acid (0.0008)
calcium carbonate (0.15)
iron sulphate (0.0024)
potassium sulphate (0.0724)
magnesium sulphate (1.5)
sodium bicarbonate (2.4808)
sodium chloride (1.1668)
calcium sulphate (0.4292)

This borewater had a TDS of 3,900 g/l, an EC of 5.82 mS/cm, pH of 8.5. When analysed, the borewater had total levels of (mg/l):

Na (1,150)
Cl (960)
Ca (66)
Mg (128)
carbonate (22)
bicarbonate (1,640)

The borewater would be considered unusable for hydroponic lettuce production. All borewater was treated by UV sterilisation before making up the nutrient solutions.

A digital EF and EMF (electrical field+electromagnetic field) frequency generator (circuit board) was used to set up modulated electrical fields and modulated electromagnetic fields to treat the hydroponics medium.

During plant growth, the electrical conductivity (EC) and pH of each treatment solution was adjusted as required. Bore water containing hydroponic nutrients was used to top up each of the treatment tanks as required to replace water lost from the system due to events such as plant uptake and evaporation.

All borewater used was supplemented with hydroponic nutrient solution Matrix Blue (Suntec, Tokomaru NZ) at a ratio of 1 part Matrix Blue per 200 parts of borewater.

Matrix Blue comprises the following components: calcium nitrate, potassium nitrate, monopotassium phosphate, magnesium sulfate, iron EDTA, manganese sulfate, zinc sulfate, boric acid, copper sulfate, ammonium molybdate, nickel sulfate, cobalt sulfate, potassium iodide, potassium dichromate, and sodium selenite.

The analysis of a 1:200 dilution of Matrix Blue in rainwater provides the following concentrations (mg/l): N (150), P (42.5), K (175), Mg (37.5), Ca (140), S (49.5), Fe (2.5), Mn (1.5), Zn (0.20), B (0.35), Cu (0.035), Mo (0.025), Co (0.0225), Ni (0.018), Cr (0.0075), I (0.0055), Se (0.0019).

All experiments started with a hydroponic medium EC of 7.95±0.15 mS/cm. This EC was comprised of EC from the bore water and EC from hydroponic nutrients. At trial completion (5 weeks), the EC range was 10.6-12.4 mS/cm. The EC increased gradually over the course of the trial, allowing the plants to adjust to the increasing osmotic pressure during this period of growth.

The EC level increased over time because salts that were not taken up by the plants accumulate in solution. Nitric and phosphoric acid (in ratio 50/50) was used to adjust pH as required to maintain a pH of 6.2-6.9.

Control experiment 3A assayed the growth of lettuce in untreated hydroponic medium. Experiment 3B assayed the growth of lettuce in an EF+EMF treated hydroponic medium using a liquid treatment device (LTD) that emits two sinusoidal waveforms that are 180° out of phase with respect to each other. Experiment 3C assayed the growth of lettuce in an EF+EMF treated hydroponic medium using a LTD that emits two square wave forms that are 180° out of phase with respect to each other.

In Example 3, the cyclotron resonance formula was not used. Rather Lorentzian agitation was relied on. Specifically, it was hypothesised that the wave amplitudes of the modulated EF and EMF emitted by the device, as well as the phase difference between the two antennae and the phase difference between the central coil and each antenna of the device, may together regardless of frequency be capable of producing or catalyzing molecular and atomic agitation, and that the CR formula therefore need not be applied. In this regard it was hypothesized that Lorentz's formula on its own could be relied on to assert the existence a force, of an unquantified magnitude, being applied to a sample of particles present in a space where an electrical field and a magnetic field coexist. While not bound by theory, it is believed that this force is capable of affecting hydration state, and even protonation or deprotonation of a sample.

In Experiments 3B and 3C, the LTD was programmed to emit frequencies in the ULF-VLF range: 1.39 kHz to 4.51 kHz. Initially, sixty four distinct frequencies, chosen randomly were emitted sequentially over a 667 second period. The frequencies were an average of 50 Hz apart. At the end of this series, the first frequency is generated again and the series repeats. After a few series have passed, the sixty four frequencies then become generated in arbitrary order with a fixed 10.42 second duration. The maximum step up or down in frequency after a 10.42 second pulse is 3.12 kHz, and the minimum step up or down in frequency after a 10.42 second pulse is 0.01 kHz. At no time was the frequency of the EF and EMF emitted by the LTD in Example 3 outside the range 1.39 kHz to 4.51 kHz.

At any and every given point in time (step), the frequency of the oscillating electromagnetic field that is generated by the central coil is the same as the frequency of the oscillating electrical field generated by the antennae at that time.

While the sinusoidal and square waveforms in Example 3 have equal frequencies, the square waveform has a greater amplitude by 48.7% than the sinusoidal waveform. Additionally, an advantage of the square waveform over the sinusoidal waveform is that with a square waveform, the amplitude is maintained over almost the entire duty cycle.

During the trials, Experiments 3A, 3B and 3C were run simultaneously under identical environmental conditions. Each lettuce variety was judged on weight, the presence of tipburn, marketability and leaf mineral content.

Once the crop matured, the plants were harvested, weighed to determine fresh weight and assessed for marketability and tipburn. Foliar samples were sent for mineral analysis. Foliar mineral analysis was done in triplicate (12 samples) on Butterhead samples, and as combined replications (4 samples) for the Lollo Rossa variety.

Results

TABLE 8

Green Butterhead (Cultivar: Fabietto RZ)

| Expt. | Treatment | Fresh weight (mean) (g) | Marketability[a] (% of crop) | Reason for damage | Tipburn mean value[b] |
|---|---|---|---|---|---|
| 3A | Control | 151.8 ± 6.69 | 17 | Tipburn | 2.06 ± 0.23 |
| 3B | LTD with sinusoidal waveforms | 216.6 ± 7.96 | 61 | Tipburn | 0.56 ± 0.18 |
| 3C | LTD with square waveforms | 262.7 ± 7.57 | 94.7 | Tipburn | 0.11 ± 0.07 |

[a]Marketability indicates the percentage of lettuce acceptable for commercial sale.
[b]Tipburn mean value indicates the degree of tipburn on a scale of 0 to 5 (0 = no tipburn; 5 = severe tipburn).

TABLE 9

Lollo Rossa (Cultivar: Sunsun Red Frill)

| Expt. | Treatment | Fresh weight (mean) (g) | Marketability[a] (% of crop) | Reason for damage | Tipburn mean value[b] |
|---|---|---|---|---|---|
| 3A | Control | 95.53 ± 4.44 | 100 | NA | 0 |
| 3B | LTD with sinusoidal waveforms | 156.1 ± 5.06 | 100 | NA | 0 |
| 3C | LTD with square waveforms | 169.3 ± 4.77 | 100 | NA | 0 |

[a]Marketability indicates the percentage of lettuce acceptable for commercial sale.
[b]Tipburn mean value indicates the degree of tipburn on a scale of 0 to 5 (0 = no tipburn; 5 = severe tipburn).

TABLE 10

Foliar Mineral Levels

| Element | Experiment 3A | Experiment 3B | Experiment 3C |
|---|---|---|---|
| Nitrogen (%) | 3.67 ± 0.05 | 4.83 ± 0.15 | 4.60 ± 0.08 |
| Phosphorus (%) | 0.40 ± 0.01 | 0.89 ± 0.02 | 0.88 ± 0.00 |
| Boron (mg/kg) | 24.67 ± 0.72 | 33.67 ± 0.27 | 35.00 ± 0.82 |
| Calcium (%) | 0.34 ± 0.01 | 0.68 ± 0.01 | 0.69 ± 0.02 |
| Iron (mg/kg) | 39.67 ± 2.60 | 74.67 ± 1.52 | 83.67 ± 4.53 |
| Potassium (%) | 4.83 ± 0.12 | 6.87 ± 0.07 | 7.13 ± 0.15 |
| Magnesium (%) | 0.28 ± 0.01 | 0.37 ± 0.01 | 0.38 ± 0.01 |
| Manganese (mg/kg) | 151.33 ± 9.36 | 161.33 ± 4.01 | 172.00 ± 10.03 |
| Sodium (%) | 1.25 ± 0.04 | 1.82 ± 0.07 | 1.90 ± 0.02 |
| Zinc (mg/kg) | 39.67 ± 0.72 | 56.00 ± 0.82 | 55.67 ± 1.91 |

Tables 8 and 9 provide information on the properties of the two lettuce varieties used during the trials of Example 3.

A comparison of the results between Experiment 3A and either Experiment 3B or 3C indicates that Lorentzian agitation treatment of the hydroponic medium is beneficial to hydroponic lettuce growth, using the measured properties of fresh weight and marketability.

A comparison between Experiment 3B and 3C also indicates that the measured properties of the lettuce improved when the medium is treated with an LTD having a square waveform with a higher amplitude, as compared to the properties of lettuce grown in medium treated with an LTD having a sinusoidal waveform of a lower amplitude.

Additionally, Table 10 provides the foliar mineral levels of selected elements from a mixed sample of Green Butterhead and Lollo Rossa. It was observed that the nitrogen, phosphorus, boron, calcium, iron, potassium, magnesium, manganese, sodium and zinc contents of the lettuce grown using hydroponic medium treated with either LTD (Experiment 3B and 3C) had increased over the control (Experiment 3A).

Example 4

In concentrated aqueous solutions, the transformation of $HCO_3^-$ (bicarbonate) to $CO_3^{2-}$ (carbonate) increases scale deposition on surfaces that the water contacts. Similarly, the transformation of carbonate to bicarbonate in concentrated aqueous solutions may lead to scale dissolution from surfaces that the water contacts. In Example 4, a mineral carbonate medium was treated using the liquid treatment device and particle size was assayed by comparison to an untreated control, to represent propensity for aggregate formation (resembling scale formation), and to demonstrate the effect of a sinusoidal waveform LTD on the sizes of mineral particles present in treated and untreated media.

Lorentzian agitation was relied upon to broadly target all solutes and the solvent. The example shows that when the LTD is installed in a location free of other electromagnetic or electrical fields, the LTD has predictable physical (measurable) effects on the behaviour of minerals in borewater. These effects can be accelerated by spiking (augmenting) the borewater involved with extra minerals. Spiking was done with small amounts of extra aqueous calcium, extra aqueous carbonate, and extra aqueous bicarbonate, and by assessing the kinetics of their association, by means of turbidity measurement.

Materials and Methods

Each treated or untreated system was of 25 litres volume, consisting of borewater plus additives. Three treated systems and three independent untreated systems were used to allow statistical analysis. The recirculation rate in each system was 1,200 litres per hour. Each system included a tub with a water surface for interaction with air. Two minerals $NaHCO_3$ and $CaCl_2$ were added at millimolar concentrations to bore water, and allowed to react in bore water to form visible mineral particles over a period of three days. The bore water was of moderate hardness and salinity (conductivity 1.7 mS/cm, calculated salinity 1.1 g/L, hardness as $CaCO_3$ 0.5 g/L, sodium 0.21 g/L, chloride 0.28 g/L). The molarity of the added $NaHCO_3$ and $CaCl_2$ were deliberately raised to 1 mM on day 1, and then to 10 mM on day 2 and then was left at that molarity for the third day.

A digital EF and EMF (electrical field+electromagnetic field) frequency generator (circuit board) was used to set up modulated electrical fields and modulated electromagnetic fields to treat the medium.

Control experiment 4A assayed the sizes of particles generated in untreated medium. Experiment 4B assayed the sizes of particles generated in a medium that has been treated with an electrical field and an electromagnetic field (EF+EMF) using a liquid treatment device (LTD) that emits two sinusoidal waveforms that are 180° out of phase with respect to each other.

In Example 4, the cyclotron resonance formula was not used. Rather Lorentzian agitation was relied on, Specifically, it was hypothesised that the wave amplitudes of the modulated EF and EMF emitted by the device, as well as the phase difference between the two antennae and the phase difference between the central coil and each antenna of the device, may together regardless of frequency be capable of producing or catalyzing molecular and atomic agitation, and that the CR formula therefore need not be applied. In this respect, it was hypothesized that Lorentz's force formula on its own could be relied upon to assert the existence a force, of an unquantified magnitude, being applied to a sample of particles present in a space where an electrical field and a magnetic field coexist. While not bound by theory, it is believed that this force is capable of affecting hydration state, and even protonation or deprotonation of a sample.

In Experiment 4B, the LTD was programmed to emit frequencies in the ULF-VLF range: 1.39 kHz to 4.51 kHz, Initially sixty four distinct frequencies, chosen randomly were emitted sequentially over a 667 second period. The frequencies were an average of 50 Hz apart. At the end of this series the first frequency is again generated and the series repeats. After a few series have passed, the sixty four frequencies then become generated in arbitrary order with a fixed 10.42 second duration. The maximum step up or down in frequency after a 10.42 second pulse is 3.12 kHz, and the minimum step up or down in frequency after a 10.42 second pulse is 0.01 kHz. At no time was the frequency of EF and EMF emitted by the LTD in Example 4 outside the range 1.39 kHz to 4.51 kHz.

At any and every given point in time (step), the frequency of the oscillating electromagnetic field that is generated by the central coil is the same as the frequency of the oscillating electrical field generated by the antennae at that time.

Calcium carbonate crystal growth was monitored as turbidity, via spectrophotometer readings at 635 nm (light "absorbance"). To investigate particle size effects, some samples were filtered through a 20 μm mesh (phytoplankton mesh) and the filtrate was analysed in the spectrophotometer. Addition of 1 mM $NaHCO_3$ and $CaCl_2$ began on day 1 in each of the six recirculation systems to produce mineral particles gradually by overnight nucleation. These unmeasured mineral particles ('nuclei') of undetermined microscopic size served as the basis for growth of larger particles when more $NaHCO_3$ and $CaCl_2$ were added on day 2.

RESULTS

It was observed on day 2 that within 30 minutes of increasing the molarity of added $NaHCO_3$ and $CaCl_2$ from 1 mM to 10 mM, the turbidity in the treated systems had rapidly become visibly greater than in the untreated systems. Measurements within the following 30 minutes confirmed the visual observation that turbidity was at that time ~15% greater in the treated systems than in the untreated systems. Filtration/fractionation begun on day 2 to establish the distribution of particle sizes, and it was observed that the turbidities of filtrates <20 μm had become significantly different between treated and control by day 3 (Table 11).

The excess of <20 μm particles observed in the treated sample (relative to the untreated sample is quantified as $100[(x-y)/y)]=35\%$ (Table 11). The results show that the LTD unit affects the kinetics of association between aqueous calcium and aqueous carbonate. The effect of the LTD is that the size distribution of particles in the treated samples, relative to the size distribution of particles in the untreated samples, is that in the treated samples the distribution is changed from a small number of large particles, to a large number of small particles, visible as increased turbidity. While not bound by theory, it appears from this example that the kinetics of $Ca^{2+}$ and $CO_3^{2-}$ association may have been altered in the LTD treated samples, in the sense of being slowed due to the LTD treatment. Specifically, it is implied that the $Ca^{2+}$ (calcium) and $CO_3^{2-}$ (carbonate) ions remained uncomplexed for a longer period of time in the treated sample as compared to the untreated sample. This may be due to a slower conversion from bicarbonate to carbonate in the treated sample. This being so, in any situation with borewater being pumped from below ground and being used for irrigation, then LTD treated calcium and/or bicarbonate ions that are independent may be able to efficiently scavenge ions of opposite charge from a layer of hardened scale, leading to gradual erosion of the layer. Similarly in a situation of reverse osmosis, minerals in the inflowing water treated by the LTD described may less easily scale the membrane or block the membrane, and so the membrane function may be maintained for longer than in an untreated system.

TABLE 11

Fraction of particles under 20 μm assayed by comparing total turbidity to turbidity of the <20 μm filtrate

| Expt. | | Absorbance @635 nm raw (total) | Absorbance of <20 μm filtrate @635 nm | (a) = Abs. of <20 μm fraction @635 nm Abs. of raw sample @635 nm |
|---|---|---|---|---|
| 4A | Control | 0.145 ± 0.0 | 0.029 ± 0.0042 | $^y$0.2023 ± 0.029 |
| 4B | LTD treated | 0.152 ± 0.001 | 0.042 ± 0.0045 | $^x$0.2735 ± 0.030 |

(a) Fraction of particles under 20 μm
$^x$Fraction of particles under 20 μm in the treated sample
$^y$Fraction of particles under 20 μm in the control (untreated) sample

The invention claimed is:

1. A liquid treatment device comprising:
two coil antennae that coil around a conduit in which a liquid including a solvent and a solute flows, the two antennae positioned in a spaced-apart arrangement, and with little or no appreciable current flowing in either antenna, communicate with each other to generate between the antennae an oscillating electric-field, having any frequency in the range from 0.3 Hz to 300 Khz, wherein each of the antennae comprises a connected end and an unconnected end; and
a generator operatively connected to the two antennae that is configured to generate an oscillating voltage in each antenna, wherein the generator is configured to drive a voltage in a first of the antennae that is 180° out of phase with a voltage in a second of the antennae to create the oscillating electric-field having any frequency in the range from 0.3 Hz to 300 KHz between the antennae which, in the presence of a separate magnetic field, generates a force that is focused on dissociating the solute particles from each other or from particles of solvent or affecting the physical equilibrium between solvent and solute by transiently aligning the solvent particles with each other to increase the solubilisation of the solute particles.

2. The liquid treatment device according to claim 1, wherein the liquid is subjected to an agitation force calculated using the Lorentz force formula:

$$F=|q|[E+(v \times B)]$$

wherein vector B is comprised of the instantaneous strength and direction of the separate magnetic field, scalar q is the solvent charge solute charge or solvent dipole charge, vector E is comprised of the strength and direction of the alternating electrical field alternating at any frequency, vector v is the instantaneous velocity (comprised of speed and direction) of an included solvent or solute particle, vector F is the force acting on a charge q when q moves within the electrical and magnetic fields, and vector F is at right angles to both vector B and vector E.

3. The liquid treatment device according to claim 1, including a power supply, and a calculator configured to calculate the oscillating voltage to generate the oscillating electric field, wherein the generator uses the power supply to generate the oscillating electric field.

4. The liquid treatment device according to claim 3, wherein the calculator is configured to calculate the agitation force acting on a charge q when q moves within the electrical field and the separate magnetic field.

5. The liquid treatment device according to claim 3, including a controller configured to carry out any one or more steps of: selecting an agitation force, estimating or measuring the magnetic field strength of the separate magnetic field, selecting a frequency for an oscillating electric field based on the agitation force selected and sending a signal to the generator to generate the oscillating electric field using the power supply.

6. The liquid treatment device according to claim 1, wherein the voltage has a curved waveform in each antenna.

7. The liquid treatment device according to claim 1, wherein the voltage has a square waveform in each antenna.

8. The liquid treatment device according to claim 1, including a magnetic field coil as a source of the separate magnetic field.

9. The liquid treatment device according to claim 8, wherein the magnetic field coil is positioned between the two antennae.

10. The liquid treatment device according to claim 8, wherein the separate magnetic field of the magnetic field coil is less than 500 T.

11. The liquid treatment device according to claim 10, wherein the magnetic field strength ranges from 1 μT to 200 μT.

12. The liquid treatment device according to claim 1, including a magnetometer for measuring the strength of the separate magnetic field in the conduit or in the vicinity of the conduit.

13. The liquid treatment device according to claim 1, wherein the separate magnetic field is the earth's magnetic field.

14. The liquid treatment device according to claim 1, wherein the force acts by causing the secondary hydration shells of the solute particles to become independent of each other.

15. The liquid treatment device according to claim 1, wherein the force is focused on transiently but iteratively increasing the alignment of solvent particles with each other via aligning solvent particle dipoles, wherein the frequency of iteration is the same as the frequency of the reversal of polarity of the electrical field, in order to effect dissociation of the solute particles from each other.

16. The liquid treatment device according to claim 1, wherein the force is focused on transiently but iteratively increasing the alignment of solvent particles via aligning solvent molecule dipoles, wherein the frequency of iteration is the same as the frequency of the reversal of polarity of the electrical field, in order to shift equilibrium from carbonate towards bicarbonate to cause dissociation of the solute particles from each other.

17. A liquid treatment device comprising:
two coil antennae that coil around a conduit in which a liquid including a solvent and a solute flows, the two antennae positioned in a spaced-apart arrangement, and with little or no appreciable current flowing in either antenna, communicate with each other to generate an oscillating electric field, wherein each of the antennae comprises a connected end and an unconnected end;
a magnetic field coil that coils around the conduit between the two coil antennae to generate a separate magnetic field; and
a generator operatively connected to the connected end of each of the two antennae that is configured to generate an oscillating voltage in each antenna wherein the generator is configured to drive a voltage in a first of the antennae that is 180° out of phase with a voltage in a second of the antennae to create the oscillating electric-field having any frequency in the range from 0.3 Hz to 30 KHz between the antennae and having an oscillating voltage frequency that is calculated as a function of the strength of the separate magnetic field, the atomic/molecular charge or dipole of a solvent or solute and the atomic/molecular mass of that solvent or solute.

18. The liquid treatment device according to claim 17, including a power supply, and a calculator for calculating the oscillating voltage to generate the oscillating electric field, wherein the generator uses the power supply to generate the oscillating electric field.

19. The liquid treatment device according to claim 18, wherein the calculator is used to calculate a frequency of the oscillating electric field based on the magnetic field strength of the separate magnetic field.

20. The liquid treatment device according to claim 17, including a controller for carrying out any one or more steps of: receiving a signal that conveys a magnetic field strength of the separate magnetic field, calculating the oscillating voltage based on the magnetic field strength, and sending a signal to the generator to generate the oscillating electric field using the power supply.

21. The liquid treatment device according to claim 17, wherein the frequency of the oscillating voltage in each antenna may be proportional to the magnetic field strength.

22. The liquid treatment device according to claim 21, wherein the frequency of the oscillating voltage in each antenna is a harmonic of the fundamental frequency of a solvent or solute, and is calculated using the cyclotron resonance harmonic formula:

$$f_{n+1} = (n+1) \cdot Bq/2\pi m$$

wherein $f_{n+1}$ is an overtone of fundamental frequency, B is the magnetic field strength, q is the solvent charge, solute charge or solvent dipole charge, m is the atomic/molecular mass of the solvent or solute and n equals zero or any whole number.

23. The liquid treatment device according to claim 22, wherein the frequency is calculated using the cyclotron resonance formula:

$$f = \frac{Bq}{2\pi m}$$

wherein scalar f is the frequency of the electric field modulation, scalar B is the magnetic field strength, scalar q is the solvent charge, solute charge or solvent dipole charge, and m is the atomic/molecular mass of the solvent or solute.

24. The liquid treatment device according to claim 17, including a magnetometer for measuring the strength of the separate magnetic field in the conduit or in the vicinity of the conduit.

25. The liquid treatment device according to claim 17, wherein the magnetic field is the earth's separate magnetic field.

26. The liquid treatment device according to claim 17, wherein the force acts by causing the secondary hydration shells of the solute particles to become independent of each other.

27. The liquid treatment device according to claim 17, wherein the force is focused on transiently but iteratively increasing the alignment of solvent particles with each other via aligning solvent particle dipoles, wherein the frequency of iteration is the same as the frequency of the reversal of polarity of the electrical field, in order to effect dissociation of the solute particles from each other.

28. The liquid treatment device according to claim 17, wherein the force is focused on transiently but iteratively increasing the alignment of solvent particles with each other via aligning solvent molecule dipoles, wherein the frequency of iteration is the same as the frequency of the reversal of polarity of the electrical field, in order to shift equilibrium from carbonate towards bicarbonate to cause dissociation of the solute particles from each other.

29. A method of treating a liquid using a liquid treatment device including two flexible antennae and a generator operatively connected to the two antennae including:
 coiling the two antennae around a conduit in which a liquid including a solvent and a solute flows, wherein the two antennae are positioned in a spaced-apart arrangement on the conduit, and wherein each of the two antennae comprises a connected end and an unconnected end;
 calculating a frequency for an oscillating electric field as a function of the strength of a separate magnetic field, an atomic/molecular charge or dipole of the solvent or solute and the atomic/molecular mass of that solvent or solute;
 operating the generator that is connected to the connected end of each of the antennae to generate an oscillating voltage in each antenna with little or no appreciable current flowing in either antenna, wherein a voltage in a first of the two antennae is 180° out of phase with a voltage in the second of the two antennae at the calculated frequency to create between the antennae an oscillating electric-field having any frequency in the range from 0.3 Hz to 300 KHz and that electric-field having an imperceptible magnetic field or no magnetic field, and which, in the presence of a separate magnetic field, generates a force that is focused on dissociating the particles of solute from each other or dissociating the particles of solute from particles of solvent, or affecting the physical equilibrium between solvent and solute by transiently aligning the solvent particles with each other to increase the solubilisation of the solute particles; and
 subjecting the liquid flowing through the conduit to the electric-field in the presence of the separate magnetic field to dissociate the particles of solute from each other or dissociating the particles of solute from particles of solvent, or to affect the physical equilibrium between solvent and solute by transiently aligning the solvent particles with each other to increase the solubilisation of the solute particles, without the liquid contacting the two antennae.

30. The method of treating a liquid according to claim 29, including a step of calculating the frequency of the oscillating voltage in each antenna that is proportional to the strength of the separate magnetic field; and operating the generator to generate the oscillating voltage in each antennae based on the frequency calculated.

31. The method of treating a liquid according to claim 29, including a step of calculating an agitation force that is a function of electric field strength, magnetic field strength and instantaneous velocity of an included solvent or solute particle.

32. The method of treating a liquid according to claim 29, including a step of measuring the strength of the separate magnetic field in the conduit or in the vicinity of the conduit using a magnetometer.

33. The method of treating a liquid according to claim 29, wherein the separate magnetic field is the earth's magnetic field.

34. The method of treating a liquid according to claim 29, wherein the step of subjecting the liquid flowing through the conduit to the electric-field in the presence of the separate magnetic field causes the secondary hydration shells of the solute particles to become independent of each other.

35. The method of treating a liquid according to claim 29, wherein the force is focused on transiently but iteratively increasing the alignment of solvent particles with each other via aligning solvent particle dipoles, wherein the frequency of iteration is the same as the frequency of the reversal of polarity of the electrical field, in order to effect separation of the solute particles.

36. The liquid treatment device according to claim 29, wherein the force is focused on transiently but iteratively increasing the alignment of solvent particles via aligning solvent molecule dipoles with each other, wherein the frequency of iteration is the same as the frequency of the reversal of polarity of the electrical field, in order to shift equilibrium from carbonate towards bicarbonate to cause separation of the solute particles.

37. A liquid treatment device comprising:
two antennae that each coil separately around a conduit, wherein a liquid including a solvent and a solute flow within the conduit, the two antennae positioned in a spaced-apart arrangement, and with little or no appreciable current flowing in either antenna, communicate with each other to generate between the antennae an oscillating electric-field, wherein each of the two antennae comprises a connected end and an unconnected end; and
a generator operatively connected to the connected end of each of the two antennae that is configured to generate a voltage difference between the antennae, wherein the generator is configured to drive a voltage in a first of the antennae that is 180° out of phase with a voltage in a second of the antennae to create the oscillating electric-field, wherein the generator is configured to generate the oscillating electric-field between the antennae by randomly selecting 64 frequencies over a predetermined time period in the range from 0.3 Hz to 300 KHz, and wherein, in the presence of a separate magnetic field, the oscillating electric-field generates a force that is focused on dissociating the solute particles from each other or from particles of solvent or affecting the physical equilibrium between solvent and solute by transiently aligning the solvent particles with each other to increase the solubilisation of the solute particles.

38. A liquid treatment device comprising:
two antennae that each coil around a conduit in which a liquid including a solvent and a solute flows, the two antennae positioned in a spaced-apart arrangement, and with little or no appreciable current flowing in either antenna, communicate with each other to generate an oscillating electric field, wherein each of the two antennae comprises a connected end and an unconnected end;
a magnetic field coil that coils around the conduit between the two antennae to generate a separate magnetic field, wherein the magnetic field coil is spaced apart from each of the two antennae on the conduit and
a generator operatively connected to the connected end of each of the two antennae that is configured to generate a voltage difference between the antennae, wherein the generator is configured to drive a voltage in a first of the antennae that is 180° out of phase with a voltage in a second of the antennae to create the oscillating electric-field between the antennae, wherein the generator is configured to generate the oscillating electric-field between the antennae at an oscillating voltage frequency that is calculated as a function of the strength of the separate magnetic field, the atomic/molecular charge or dipole of a solvent or solute and the atomic/molecular mass of that solvent or solute, which, in the presence of the separate magnetic field, generates a force that is focused on dissociating the solute particles from each other or dissociating the particles of solute from particles of solvent, or affecting the physical equilibrium between solvent and solute by transiently aligning the solvent particles to increase the solubilisation of the solute particles.

39. A method of treating a liquid using a liquid treatment device including two flexible antennae and a generator operatively connected to the two antennae including:
coiling the two antennae around a conduit in which a liquid including a solvent and a solute flows, wherein the two antennae are coiled on the conduit in a spaced-apart arrangement, and wherein each of the two antennae comprises a connected end and an unconnected end;
coiling on the conduit a magnetic field coil to generate a separate magnetic field, wherein the magnetic field coil is positioned between the two antennae and spaced apart from each of the two antennae on the conduit; and
operating the generator to generate a voltage difference between the antennae with little or no appreciable current flowing in either antenna, wherein each voltage is 180° out of phase with the other to create between the antennae an oscillating electric-field having 64 frequencies in the range from 0.3 Hz to 300 KHz chosen randomly over a predetermined time period, wherein, in the presence of the separate magnetic field, the electric-field generates a force that is focused on dissociating the particles of solute from each other or dissociating the particles of solute from particles of solvent, or affecting the physical equilibrium between solvent and solute by transiently aligning the solvent particles with each other to increase the solubilisation of the solute particles; and
subjecting the liquid flowing through the conduit to the electric-field in the presence of the separate magnetic field to dissociate the particles of solute from each other or dissociating the particles of solute from particles of solvent, or to affect the physical equilibrium between solvent and solute by transiently aligning the solvent particles with each other to increase the solubilisation of the solute particles, without the liquid contacting the two antennae.

* * * * *